(12) United States Patent
Robillard et al.

(10) Patent No.: US 9,398,294 B2
(45) Date of Patent: Jul. 19, 2016

(54) AUDIO OR VIDEO ENCODER, AUDIO OR VIDEO DECODER AND RELATED METHODS FOR PROCESSING MULTI-CHANNEL AUDIO OR VIDEO SIGNALS USING A VARIABLE PREDICTION DIRECTION

(71) Applicant: Fraunhofer-Gesellschaft zur Foerderung der angewandten Forschung e.V., Munich (DE)

(72) Inventors: Julien Robillard, Nuremberg (DE); Matthias Neusinger, Rohr (DE); Christian Helmrich, Erlangen (DE); Johannes Hilpert, Nuremberg (DE); Nikolaus Rettelbach, Nuremberg (DE); Sascha Disch, Fuerth (DE); Bernd Edler, Hannover (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 832 days.

(21) Appl. No.: 13/645,707

(22) Filed: Oct. 5, 2012

(65) Prior Publication Data
US 2013/0121411 A1 May 16, 2013

Related U.S. Application Data

(63) Continuation of application No. PCT/EP2011/052354, filed on Feb. 17, 2011.

(60) Provisional application No. 61/323,683, filed on Apr. 13, 2010.

(51) Int. Cl.
*H04N 19/50* (2014.01)
*G10L 19/008* (2013.01)
(Continued)

(52) U.S. Cl.
CPC ........ *H04N 19/00569* (2013.01); *G10L 19/008* (2013.01); *G10L 19/06* (2013.01); *H04N 19/50* (2014.11)

(58) Field of Classification Search
CPC ......... G10L 21/00; G10L 19/00; G10L 19/06; G10L 19/008; H04N 19/00569; H04N 19/50; G06F 17/00
See application file for complete search history.

(56) References Cited

U.S. PATENT DOCUMENTS 5,285,498 A * 2/1994 Johnston ................ H04H 20/88
381/2
5,754,733 A 5/1998 Gardner et al.
(Continued)

FOREIGN PATENT DOCUMENTS

| CN | 101067931 A | 11/2007 |
|----|-------------|---------|
| CN | 101501760 A | 8/2009 |

(Continued)

OTHER PUBLICATIONS

Carlsson, Pontus et al., "Technical description of CE on improved stereo coding in USAC", ISO/IEC JTC1/SC29/WG11, Jul. 2010.
(Continued)

*Primary Examiner* — Chikaodili E Anyikire
*Assistant Examiner* — Dramos I Kalapodas
(74) *Attorney, Agent, or Firm* — Perkins Coie LLP; Michael A. Glenn

(57) ABSTRACT

An encoder/decoder is based on a combination of two audio or video channels to obtain a first combination signal as a mid-signal and a residual signal derivable using a predicted side signal derived from the mid-signal. A decoder uses the prediction residual signal, the first combination signal, a prediction direction indicator and prediction information to derive decoded first channel and second channel signals. A real-to-imaginary transform can be applied for estimating the imaginary part of the spectrum of the first combination signal. The prediction signal used in the derivation of the prediction residual signal, the real-valued first combination signal is multiplied by a real portion of the complex prediction information and the estimated imaginary part of the first combination signal is multiplied by an imaginary portion of the complex prediction information.

19 Claims, 20 Drawing Sheets

(ENCODER SIDE)

(51) Int. Cl.
   *G10L 19/06*   (2013.01)
   *G06F 17/00*   (2006.01)
   *G10L 19/00*   (2013.01)
   *G10L 21/00*   (2013.01)

(56) References Cited

U.S. PATENT DOCUMENTS

| | | | |
|---|---|---|---|
| 5,808,569 A | | 9/1998 | Wuppermann et al. |
| 6,012,025 A | | 1/2000 | Yin |
| 6,539,357 B1 | * | 3/2003 | Sinha .................. 704/270.1 |
| 7,437,299 B2 | * | 10/2008 | Aarts et al. ............... 704/500 |
| 7,822,617 B2 | * | 10/2010 | Taleb et al. ............... 704/501 |
| 8,290,783 B2 | * | 10/2012 | Schnell et al. ............ 704/500 |
| 8,655,670 B2 | * | 2/2014 | Purnhagen ........... G10L 19/008 704/220 |
| 2002/0010577 A1 | | 1/2002 | Matsumoto et al. |
| 2002/0040299 A1 | | 4/2002 | Makino et al. |
| 2005/0141721 A1 | * | 6/2005 | Aarts et al. .................. 381/16 |
| 2005/0197831 A1 | * | 9/2005 | Edler ............... G10L 19/00 704/202 |
| 2008/0002842 A1 | | 1/2008 | Neusinger |
| 2008/0004883 A1 | * | 1/2008 | Vilermo et al. ............. 704/500 |
| 2008/0249765 A1 | * | 10/2008 | Schuijers ........... G10L 19/0212 704/203 |
| 2008/0262853 A1 | | 10/2008 | Jung |
| 2009/0262945 A1 | * | 10/2009 | Teo et al. ..................... 381/2 |
| 2010/0014679 A1 | * | 1/2010 | Kim et al. .................. 381/23 |
| 2011/0046946 A1 | * | 2/2011 | Liu ................... G10L 19/008 704/203 |
| 2011/0096932 A1 | * | 4/2011 | Schuijers ..................... 381/22 |
| 2011/0224994 A1 | * | 9/2011 | Norvell ............... G10L 19/008 704/500 |
| 2011/0257981 A1 | * | 10/2011 | Beack ................. G10L 19/125 704/500 |
| 2011/0288872 A1 | * | 11/2011 | Liu ................... G10L 19/008 704/500 |
| 2013/0028426 A1 | * | 1/2013 | Purnhagen ........... G10L 19/008 381/22 |
| 2013/0030817 A1 | * | 1/2013 | Purnhagen ........... G10L 19/008 704/500 |
| 2013/0108077 A1 | | 5/2013 | Edler et al. |
| 2013/0266145 A1 | * | 10/2013 | Purnhagen ........... G10L 19/008 381/22 |

FOREIGN PATENT DOCUMENTS

| | | |
|---|---|---|
| EP | 0673014 A2 | 9/1995 |
| EP | 1262956 A2 | 12/2002 |
| EP | 1278184 A2 | 1/2003 |
| JP | H04506141 | 10/1992 |
| JP | 09-073299 A | 3/1997 |
| JP | 2004-246038 A | 9/2004 |
| JP | 2005-522721 | 7/2005 |
| JP | 2013-525830 | 6/2013 |
| KR | 2002-0077959 A | 10/2002 |
| RU | 2144261 C1 | 1/2000 |
| RU | 98103512 A | 1/2000 |
| WO | WO2008/014853 | 2/2008 |
| WO | WO-2008/084427 | 7/2008 |
| WO | WO2009/141775 | 11/2009 |

OTHER PUBLICATIONS

Purnhagen, Heiko et al., "Technical description of proposed Unified Stereo Coding in USAC", ISO/IEC JTC1/SC29/WG11, Oct. 2009.

* cited by examiner (AUDIO DECODER)

(AUDIO ENCODER)

(AUDIO ENCODER SIDE)

$\alpha = RE_\alpha + jIm_\alpha$ $\alpha = |\alpha| \cdot e^{j\varphi_\alpha}$ $1^{st}$ part: $RE_\alpha$ or $|\alpha|$ $2^{nd}$ part: $Im_\alpha$ or $\varphi_\alpha$ $$\begin{bmatrix} M \\ D \end{bmatrix} = \frac{1}{2} \begin{bmatrix} 1 & 1 \\ 1-\alpha & -1-\alpha \end{bmatrix} \begin{bmatrix} L \\ R \end{bmatrix}$$

(AUDIO ENCODER SIDE)

$M = \frac{1}{2}(L+R)$ $S = \frac{1}{2}(L-R)$ (COMBINATION RULE)

(AUDIO DECODER SIDE)

(AUDIO DECODER SIDE)

$L = M + S$ $R = M - S$ (INVERSE COMBINATION RULE)

(ENCODER SIDE)

(DECODER SIDE)

(ENCODER SIDE)

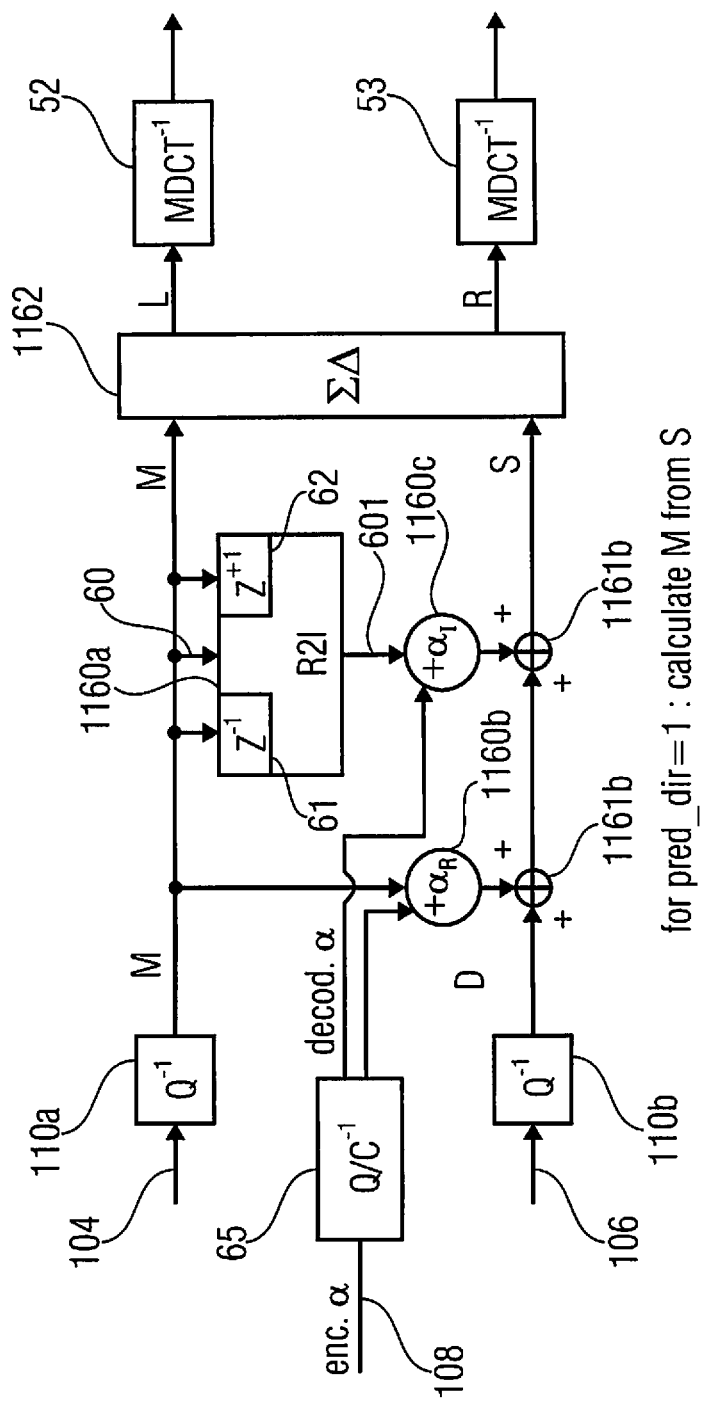
FIG 6B (DECODER SIDE)

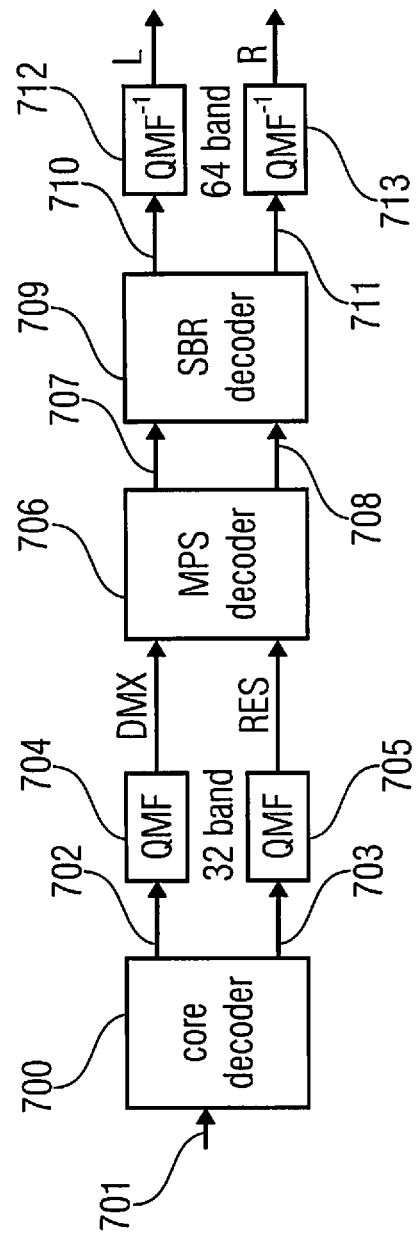

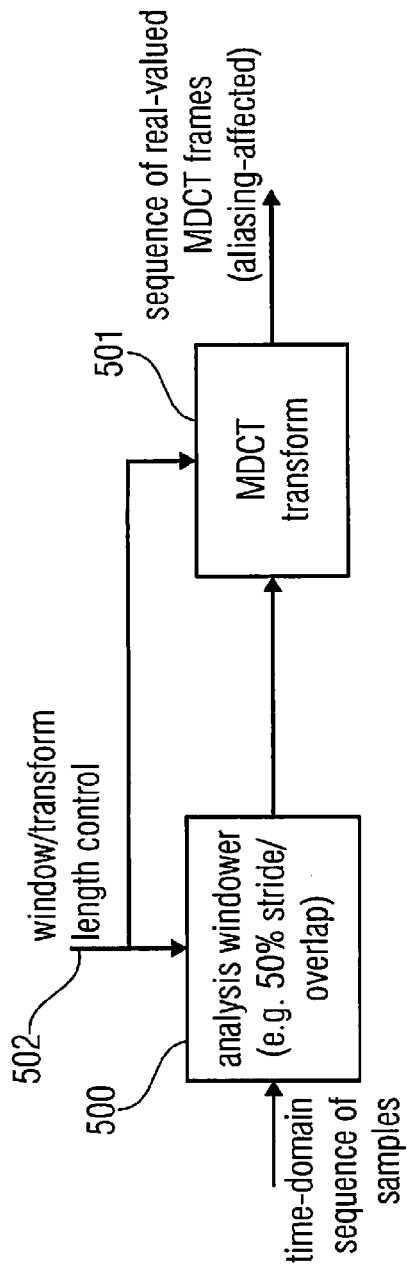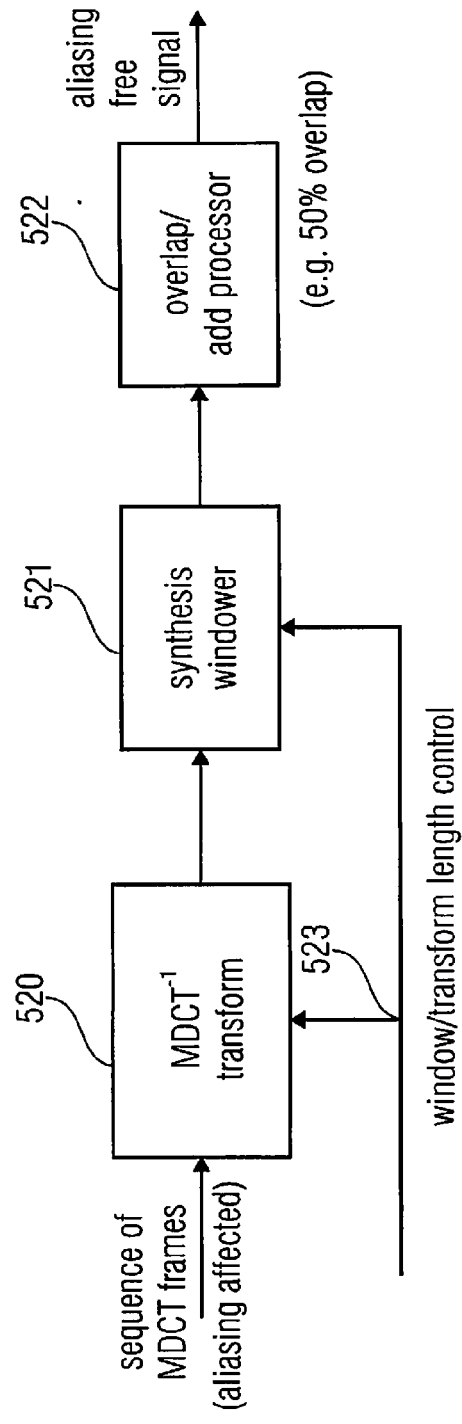
FIG 8A
FIG 8B (ENCODER SIDE)

(DECODER SIDE)

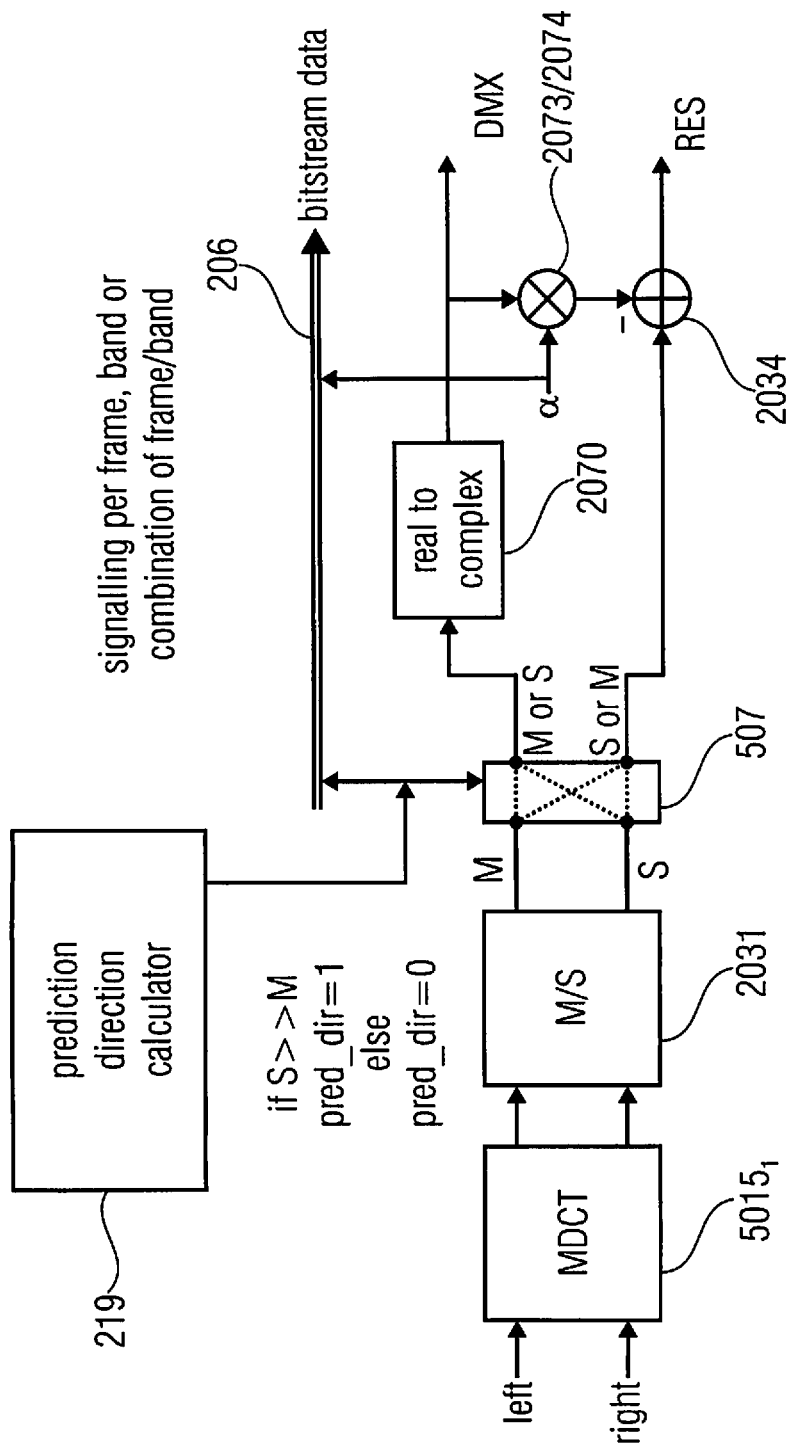
FIG 12A (ENCODER SIDE)

(DECODER SIDE)

FIG 13A pred_dir   indicates the direction of prediction according to:

| pred_dir | meaning |
|---|---|
| 0 | prediction from mid to side channel |
| 1 | prediction from side to mid channel |

FIG 13B (1) pred_dir=0 :  RES = (S - α·M); transmit: M, RES, α

(2) pred_dir=1 :  RES = (M - α·S); transmit: S, RES, α

NOTE: sign of α can be reversed in all equations.

FIG 13C

<u>pred_dir=0:</u> explicit inverse prediction: $S = RES + \alpha \cdot M$; $L = \frac{1}{2}(M+S)$
$R = \frac{1}{2}(M-S)$ implicit inverse prediction: $L = \frac{1}{2}[M(1-\alpha) + RES]$ $R = \frac{1}{2}[M(1+\alpha) 1 RES]$

FIG 13D

<u>pred_dir=1:</u> explicit inverse prediction: $M = RES + \alpha \cdot S$; $L = \frac{1}{2}(M+S)$
$R = \frac{1}{2}(M-S)$ implicit inverse prediction: $L = \frac{1}{2}[S(\alpha+1) + RES]$ $R = \frac{1}{2}[S(\alpha-1) + RES]$ $$\alpha \cdot M \triangleq \alpha_{Re} \cdot M_{Re} - \alpha_{Im} \cdot M_{Im}$$
$$(1+\alpha) \cdot M \triangleq (1+\alpha_{Re}) \cdot M_{Re} - \alpha_{Im} \cdot M_{Im}$$
complex products, if $\alpha$ is complex
FIG 13E
determination of Pred_dir flag
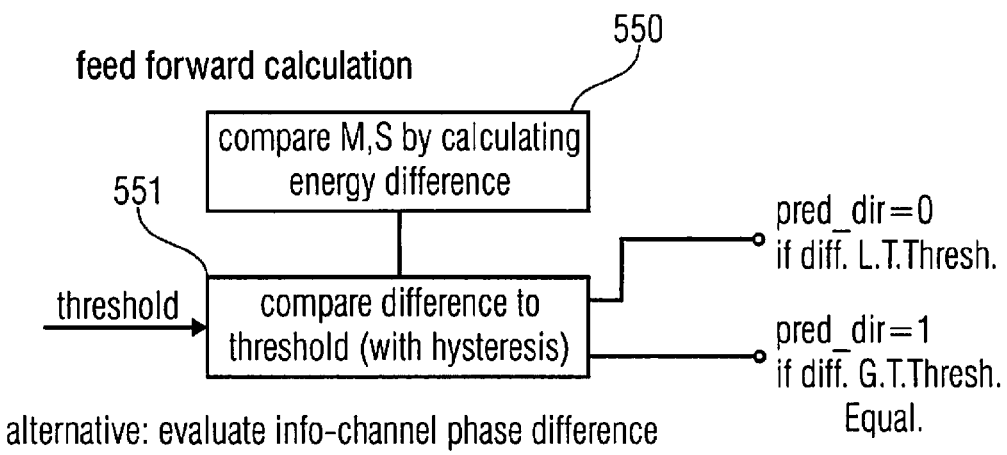
FIG 14A
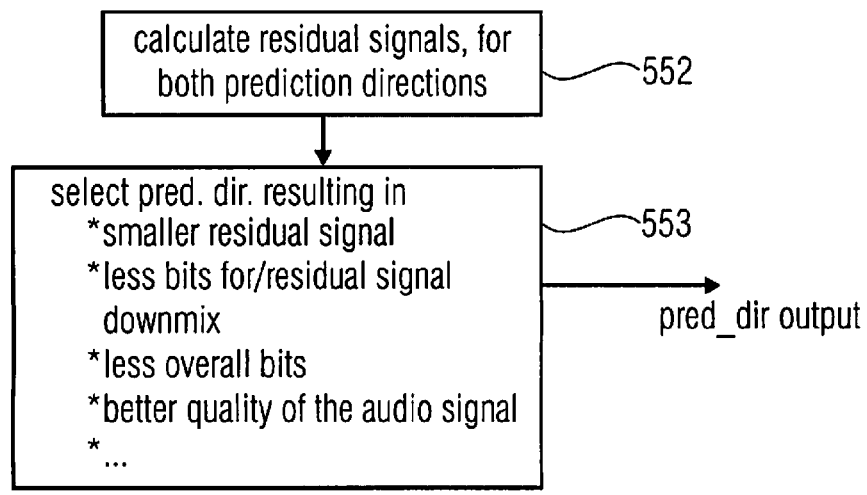
FIG 14B

AUDIO OR VIDEO ENCODER, AUDIO OR VIDEO DECODER AND RELATED METHODS FOR PROCESSING MULTI-CHANNEL AUDIO OR VIDEO SIGNALS USING A VARIABLE PREDICTION DIRECTION

CROSS-REFERENCE TO RELATED APPLICATIONS

This application is a continuation of copending International Application No. PCT/EP2011/052354, filed Feb. 17, 2011, which is incorporated herein by reference in its entirety, and additionally claims priority from US Application No. 61/323,683, filed Apr. 13, 2010, which is also incorporated herein by reference in its entirety.

The present invention is related to audio or video processing and, particularly, to multi-channel audio or video processing of a multi-channel signal having two or more channel signals.

BACKGROUND OF THE INVENTION

It is known in the field of multi-channel or stereo processing to apply the so-called mid/side stereo coding. In this concept, a combination of the left or first audio channel signal and the right or second audio channel signal is formed to obtain a mid or mono signal M. Additionally, a difference between the left or first channel signal and the right or second channel signal is formed to obtain the side signal S. This mid/side coding method results in a significant coding gain, when the left signal and the right signal are quite similar to each other, since the side signal will become quite small. Typically, a coding gain of a quantizer/entropy encoder stage will become higher, when the range of values to be quantized/entropy-encoded becomes smaller. Hence, for a PCM or a Huffman-based or arithmetic entropy-encoder, the coding gain increases, when the side signal becomes smaller. There exist, however, certain situations in which the mid/side coding will not result in a coding gain. The situation can occur when the signals in both channels are phase-shifted to each other, for example, by 90°. Then, the mid signal and the side signal can be in a quite similar range and, therefore, coding of the mid signal and the side signal using the entropy encoder will not result in a coding gain and can even result in an increased bit rate. Therefore, a frequency-selective mid/side coding can be applied in order to deactivate the mid/side coding in bands, where the side signal does not become smaller to a certain degree with respect to the original left signal, for example.

Although the side signal will become zero, when the left and right signals are identical, resulting in a maximum coding gain due to the elimination of the side signal, the situation once again becomes different when the mid signal and the side signal are identical with respect to the shape of the waveform, but the only difference between both signals is their overall amplitudes. In this case, when it is additionally assumed that the side signal has no phase-shift to the mid signal, the side signal significantly increases, although, on the other hand, the mid signal does not decrease so much with respect to its value range. When such a situation occurs in a certain frequency band, then one would again deactivate mid/side coding due to the lack of coding gain. Mid/side coding can be applied frequency-selectively or can alternatively be applied in the time domain.

There exist alternative multi-channel coding techniques which do not rely on a kind of a waveform approach as mid/side coding, but which rely on the parametric processing based on certain binaural cues. Such techniques are known under the term "binaural cue coding", "parametric stereo coding" or "MPEG Surround coding". Here, certain cues are calculated for a plurality of frequency bands. These cues include inter-channel level differences, inter-channel coherence measures, inter-channel time differences and/or inter-channel phase differences. These approaches start from the assumption that a multi-channel impression felt by the listener does not necessarily rely on the detailed waveforms of the two channels, but relies on the accurate frequency-selectively provided cues or inter-channel information. This means that, in a rendering machine, care has to be taken to render multi-channel signals which accurately reflect the cues, but the waveforms are not of decisive importance.

This approach can be complex particularly in the case, when the decoder has to apply a decorrelation processing in order to artificially create stereo signals which are decorrelated from each other, although all these channels are derived from one and the same downmix channel. Decorrelators for this purpose are, depending on their implementation, complex and may introduce artifacts particularly in the case of transient signal portions. Additionally, in contrast to waveform coding, the parametric coding approach is a lossy coding approach which inevitably results in a loss of information not only introduced by the typical quantization but also introduced by focusing on the binaural cues rather than the particular waveforms. This approach results in very low bit rates but may include quality compromises.

There exist recent developments for unified speech and audio coding (USAC) illustrated in FIG. 7a. A core decoder 700 performs a decoding operation of the encoded stereo signal at input 701, which can be mid/side encoded. The core decoder outputs a mid signal at line 702 and a side or residual signal at line 703. Both signals are transformed into a QMF domain by QMF filter banks 704 and 705. Then, an MPEG Surround decoder 706 is applied to generate a left channel signal 707 and a right channel signal 708. These low-band signals are subsequently introduced into a spectral band replication (SBR) decoder 709, which produces broad-band left and right signals on the lines 710 and 711, which are then transformed into a time domain by the QMF synthesis filter banks 712, 713 so that broad-band left and right signals L, R are obtained.

FIG. 7b illustrates the situation when the MPEG Surround decoder 706 would perform a mid/side decoding. Alternatively, the MPEG Surround decoder block 706 could perform a binaural cue based parametric decoding for generating stereo signals from a single mono core decoder signal. Naturally, the MPEG Surround decoder 706 could also generate a plurality of low band output signals to be input into the SBR decoder block 709 using parametric information such as inter-channel level differences, inter-channel coherence measures or other such inter-channel information parameters.

When the MPEG Surround decoder block 706 performs the mid/side decoding illustrated in FIG. 7b, a real-gain factor g can be applied and DMX/RES and L/R are downmix/residual and left/right signals, respectively, represented in the complex hybrid QMF domain.

Using a combination of a block 706 and a block 709 causes only a small increase in computational complexity compared to a stereo decoder used as a basis, because the complex QMF representation of the signal is already available as part of the SBR decoder. In a non-SBR configuration, however, QMF-based stereo coding, as proposed in the context of USAC, would result in a significant increase in computational complexity because of the QMF banks that may be used which would involve in this example 64-band analysis banks and 64-band synthesis banks. These filter banks would have to be added only for the purpose of stereo coding.

In the MPEG USAC system under development, however, there also exist coding modes at high bit rates where SBR typically is not used.

SUMMARY

According to an embodiment, an audio or video decoder for decoding an encoded multi-channel audio or video signal, the encoded multi-channel audio or video signal having an encoded first combination signal generated based on a combination rule for combining a first channel audio or video signal and a second channel audio or video signal of a multi-channel audio or video signal, an encoded prediction residual signal and prediction information, may have: a signal decoder for decoding the encoded first combination signal to acquire a decoded first combination signal, and for decoding the encoded residual signal to acquire a decoded residual signal; and a decoder calculator for calculating a decoded multi-channel signal having a decoded first channel signal, and a decoded second channel signal using the decoded residual signal, the prediction information, the decoded first combination signal and a prediction direction indicator, so that the decoded first channel signal and the decoded second channel signal are at least approximations of the first channel signal and the second channel signal of the multi-channel signal.

According to another embodiment, an audio or video encoder for encoding a multi-channel audio or video signal having two or more channel signals, may have: an encoder calculator for calculating a first combination signal and a prediction residual signal using a first channel signal and a second channel signal and prediction information and a prediction direction indicator, so that a prediction residual signal, when combined with a prediction signal derived from the first combination signal or a signal derived from the first combination signal and the prediction information results in a second combination signal, the first combination signal and the second combination signal being derivable from the first channel signal and the second channel signal using a combination rule; an optimizer for calculating the prediction information so that the prediction residual signal fulfills an optimization target; a prediction direction calculator for calculating a prediction direction indicator indicating a prediction direction associated with the prediction residual signal; a signal encoder for encoding the first combination signal and the prediction residual signal to acquire an encoded first combination signal and an encoded prediction residual signal; and an output interface for combining the encoded first combination signal, the encoded prediction residual signal and the prediction information to acquire an encoded multi-channel audio or video signal.

According to another embodiment, a method of decoding an encoded multi-channel audio or video signal, the encoded multi-channel audio or video signal having an encoded first combination signal generated based on a combination rule for combining a first channel audio or video signal and a second channel audio or video signal of a multi-channel audio or video signal, an encoded prediction residual signal and prediction information, may have the steps of: decoding the encoded first combination signal to acquire a decoded first combination signal, and decoding the encoded residual signal to acquire a decoded residual signal; and calculating a decoded multi-channel signal having a decoded first channel signal, and a decoded second channel signal using the decoded residual signal, the prediction information and the decoded first combination signal, so that the decoded first channel signal and the decoded second channel signal are at least approximations of the first channel signal and the second channel signal of the multi-channel signal, wherein the prediction information has a real-valued portion different from zero and/or an imaginary portion different from zero.

According to another embodiment, a method of encoding a multi-channel audio or video signal having two or more channel signals may have the steps of: calculating a first combination signal and a prediction residual signal using a first channel signal and a second channel signal and prediction information, so that a prediction residual signal, when combined with a prediction signal derived from the first combination signal or a signal derived from the first combination signal and the prediction information results in a second combination signal, the first combination signal and the second combination signal being derivable from the first channel signal and the second channel signal using a combination rule; calculating the prediction information so that the prediction residual signal fulfills an optimization target; encoding the first combination signal and the prediction residual signal to acquire an encoded first combination signal and an encoded residual signal; and combining the encoded first combination signal, the encoded prediction residual signal and the prediction information to acquire an encoded multi-channel audio or video signal.

Another embodiment may have a computer program for performing, when running on a computer or a processor, the method of decoding an encoded multi-channel audio or video signal, the encoded multi-channel audio or video signal having an encoded first combination signal generated based on a combination rule for combining a first channel audio or video signal and a second channel audio or video signal of a multi-channel audio or video signal, an encoded prediction residual signal and prediction information, which method may have the steps of: decoding the encoded first combination signal to acquire a decoded first combination signal, and decoding the encoded residual signal to acquire a decoded residual signal; and calculating a decoded multi-channel signal having a decoded first channel signal, and a decoded second channel signal using the decoded residual signal, the prediction information and the decoded first combination signal, so that the decoded first channel signal and the decoded second channel signal are at least approximations of the first channel signal and the second channel signal of the multi-channel signal, wherein the prediction information has a real-valued portion different from zero and/or an imaginary portion different from zero.

Another embodiment may have a computer program for performing, when running on a computer or a processor, the method of encoding a multi-channel audio or video signal having two or more channel signals, which method may have the steps of: calculating a first combination signal and a prediction residual signal using a first channel signal and a second channel signal and prediction information, so that a prediction residual signal, when combined with a prediction signal derived from the first combination signal or a signal derived from the first combination signal and the prediction information results in a second combination signal, the first combination signal and the second combination signal being derivable from the first channel signal and the second channel signal using a combination rule; calculating the prediction information so that the prediction residual signal fulfills an optimization target; encoding the first combination signal and the prediction residual signal to acquire an encoded first combination signal and an encoded residual signal; and combining the encoded first combination signal, the encoded prediction residual signal and the prediction information to acquire an encoded multi-channel audio or video signal.

According to another embodiment, an encoded multi-channel audio or video signal may have: an encoded first combination signal generated based on a combination rule for combining a first channel audio or video signal and a second channel audio or video signal of a multi-channel audio or video signal, an encoded prediction residual signal, prediction information, and a prediction direction indicator indicating a prediction direction associated with the encoded prediction residual signal.

The present invention relies on the finding that a coding gain of the high quality waveform coding approach can be significantly enhanced by a prediction of a second combination signal using a first combination signal, where both combination signals are derived from the original signals using a combination rule such as the mid/side combination rule. It has been found that this prediction information is calculated by a predictor in an audio or video encoder so that an optimization target is fulfilled, incurs only a small overhead, but results in a significant decrease of bit rate that may be used for the side signal without losing any audio or video quality, since the inventive prediction is nevertheless a waveform-based coding and not a parameter-based stereo or multi-channel coding approach. In order to reduce computational complexity, it is advantageous to perform frequency-domain encoding, where the prediction information is derived from frequency-domain input data in a band-selective way. The conversion algorithm for converting the time-domain representation into a spectral representation is advantageously a critically sampled process such as a modified discrete cosine transform (MDCT) or a modified discrete sine transform (MDST), which is different from a complex transform in that only real values or only imaginary values are calculated, while, in a complex transform, real and complex values of a spectrum are calculated resulting in 2-times oversampling.

Furthermore, the concept of switching the direction of prediction achieves an increase in prediction gain with a minimum computational effort. To this end, the encoder determines a prediction direction indicator indicating a prediction direction associated with the prediction residual signal. In an embodiment, the first combination signal such as the mid signal is used for predicting the second combination signal such as the side signal. This approach is useful, when the energy of the mid signal is higher than the energy of the side signal. When, however, the energy of the second combination signal such as the side signal is higher than the energy of the first combination signal, i.e. when the energy of the side signal is higher than the energy of the mid signal, then the prediction direction is reversed and the side signal is used for predicting the mid signal. In the first case, i.e. when the mid signal is used to predict the side signal, the mid signal, the residual signal, the prediction information and the prediction direction indicator indicating this prediction direction are transmitted from an encoder to a decoder. In the second case, where the second combination signal is used for predicting the first combination signal, such as when the side signal is used for predicting the mid signal, the side signal (rather than the mid signal) is transmitted together with the residual signal, the prediction information and the prediction direction indicator indicating this reversed direction.

This procedure allows for better masking of the resulting quantization noise. For signals that have most of their energy in the second combination signal such as the side channel, predicting the first combination signal such as the mid signal from the side signal S allows for a panning of the dominant part of the quantization noise according to the original sound source. This in turn results in the perceptually more adequate error distribution in the final output signal.

This procedure has the further advantage that it provides an efficient multi-channel pair-wise coding which is, in the case of just two channels, an efficient stereo coding. The signal adaptive choice of the prediction direction for mid/side (M/S) coding ensures a higher prediction gain for signals with dominant energy in the side signal, at a minimal increase in computational complexity. Additionally, a perceptually better adapted masking of the resulting quantization noise due to panning of the perceived spatial direction of the quantization noise to the direction of the main signal is obtained. Furthermore, the range of values for the prediction coefficients to be transmitted in the bitstream is reduced, which allows for a more efficient coding of the prediction information/coefficients. This procedure is useful for all kinds of stereo processing applications such as joint transform coding of dual- or multi-channel audio and video signals.

Advantageously, a transform based on aliasing introduction and cancellation is used. The MDCT, in particular, is such a transform and allows a cross-fading between subsequent blocks without any overhead due to the well-known time domain aliasing cancellation (TDAC) property which is obtained by overlap-add-processing on the decoder side.

Advantageously, the prediction information calculated in the encoder, transmitted to the decoder and used in the decoder comprises an imaginary part which can advantageously reflect phase differences between the two audio or video channels in arbitrarily selected amounts between 0° and 360°. Computational complexity is significantly reduced when only a real-valued transform or, in general, a transform is applied which either provides a real spectrum only or provides an imaginary spectrum only. In order to make use of this imaginary prediction information which indicates a phase shift between a certain band of the left signal and a corresponding band of the right signal, a real-to-imaginary converter or, depending on the implementation of the transform, an imaginary-to-real converter is provided in the decoder in order to calculate a phase-rotated prediction signal from the first combination signal, which is phase-rotated with respect to the original combination signal. This phase-rotated prediction signal can then be combined with the prediction residual signal transmitted in the bit stream to re-generate a side signal which, finally, can be combined with the mid signal to obtain the decoded left channel in a certain band and the decoded right channel in this band.

To increase audio or video quality, the same real-to-imaginary or imaginary-to-real converter which is applied on the decoder side is implemented on the encoder side as well, when the prediction residual signal is calculated in the encoder.

The present invention is advantageous in that it provides an improved audio or video quality and a reduced bit rate compared to systems having the same bit rate or having the same audio or video quality.

Additionally, advantages with respect to computational efficiency of unified stereo coding useful in the MPEG USAC system at high bit rates are obtained, where SBR is typically not used. Instead of processing the signal in the complex hybrid QMF domain, these approaches implement residual-based predictive stereo coding in the native MDCT domain of the underlying stereo transform coder.

In accordance with an aspect of the present invention, the present invention comprises an apparatus or method for generating a stereo signal by complex prediction in the MDCT domain, wherein the complex prediction is done in the MDCT domain using a real-to-complex transform, where this stereo signal can either be an encoded stereo signal on the encoder side or can alternatively be a decoded/transmitted stereo signal, when the apparatus or method for generating the stereo signal is applied on the decoder side.

BRIEF DESCRIPTION OF THE DRAWINGS

Embodiments of the present invention will be detailed subsequently referring to the appended drawings, in which:

FIG. 6b illustrates an audio or video decoder operating in the MDCT domain and using a real-to-imaginary transform;

FIG. 7a illustrates an audio postprocessor using a stereo decoder and a subsequently connected SBR decoder;

FIG. 7b illustrates a mid/side upmix matrix;

FIG. 8a illustrates a detailed view on the MDCT block in FIG. 6a;

FIG. 8b illustrates a detailed view on the MDCT$^{-1}$ block of FIG. 6b;

FIG. 10b illustrates a possible implementation of the imaginary spectrum calculator of FIG. 10a;

FIG. 12a illustrates a further embodiment of an audio or video encoder having a reversible prediction direction;

FIG. 13a illustrates a prediction direction flag;

FIG. 13b illustrates an implementation of the different encoder-side prediction rules depending on the prediction direction indicator;

FIG. 13c illustrates decoder-side calculation rules for a prediction direction indicator having a first state;

FIG. 13d illustrates a decoder-side calculation rule for a different prediction direction indicator having a second state;

FIG. 13e illustrates complex-valued multiplications applied in embodiments of the audio or video encoder or the audio or video decoder; and FIG. 14a-b illustrates embodiments for determining the prediction direction indicator.

DETAILED DESCRIPTION OF THE INVENTION

Figure 1:
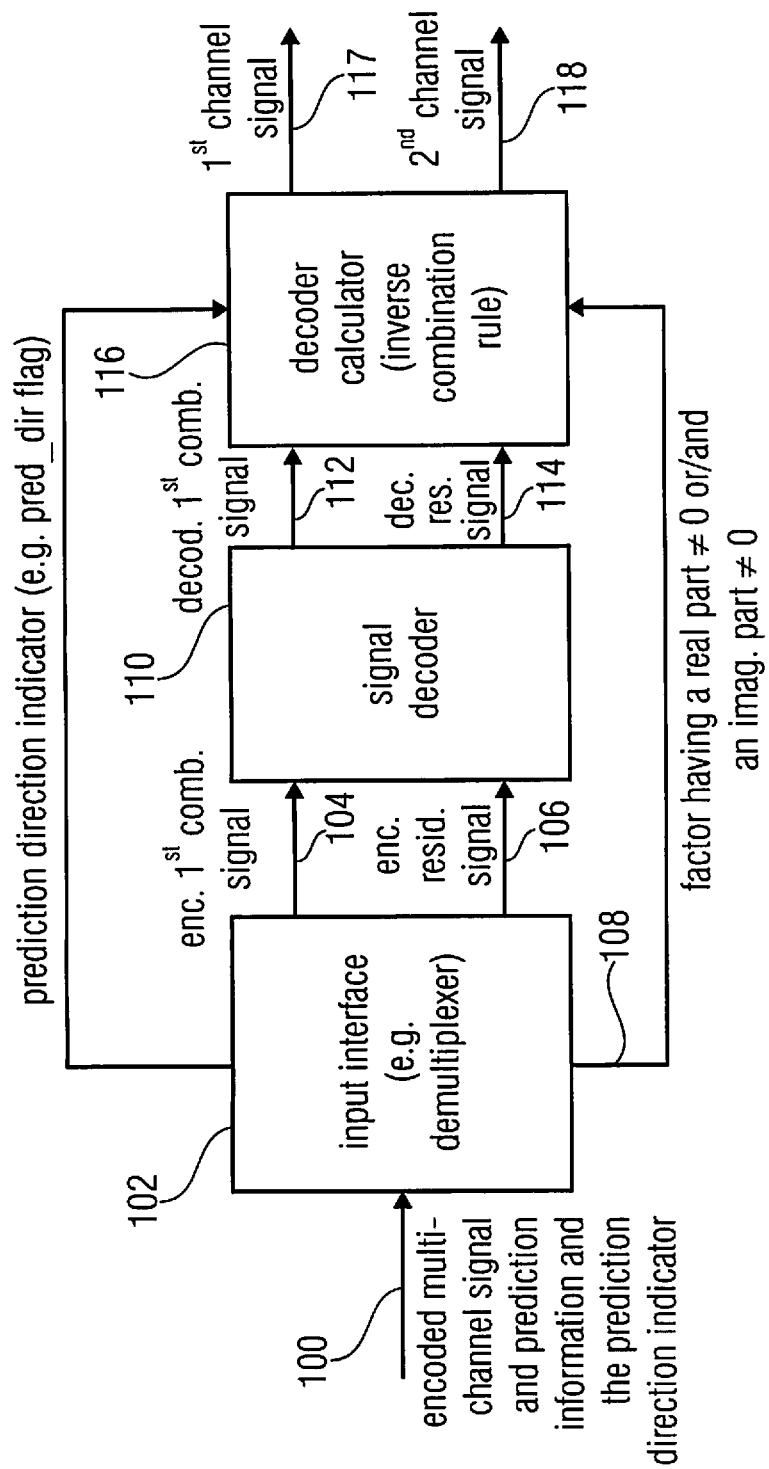
FIG. 1 is a block diagram of an embodiment of an audio or video decoder.

FIG. 1 illustrates an audio or video decoder for decoding an encoded multi-channel audio signal obtained at an input line 100. The encoded multi-channel audio signal comprises an encoded first combination signal generated using a combination rule for combining a first channel signal and a second channel signal representing the multi-channel audio signal, an encoded prediction residual signal and prediction information. The encoded multi-channel signal can be a data stream such as a bitstream which has the three components in a multiplexed form. Additional side information can be included in the encoded multi-channel signal on line 100. The signal is input into an input interface 102. The input interface 102 can be implemented as a data stream demultiplexer which outputs the encoded first combination signal on line 104, the encoded residual signal on line 106 and the prediction information on line 108. Advantageously, the prediction information is a factor having a real part not equal to zero and/or an imaginary part different from zero. The encoded combination signal and the encoded residual signal are input into a signal decoder 110 for decoding the first combination signal to obtain a decoded first combination signal on line 112. Additionally, the signal decoder 110 is configured for decoding the encoded residual signal to obtain a decoded residual signal on line 114. Depending on the encoding processing on an audio encoder side, the signal decoder may comprise an entropy-decoder such as a Huffman decoder, an arithmetic decoder or any other entropy-decoder and a subsequently connected dequantization stage for performing a dequantization operation matching with a quantizer operation in an associated audio encoder. The signals on line 112 and 114 are input into a decoder calculator 115, which outputs the first channel signal on line 117 and a second channel signal on line 118, where these two signals are stereo signals or two channels of a multi-channel audio signal. When, for example, the multi-channel audio signal comprises five channels, then the two signals are two channels from the multi-channel signal. In order to fully encode such a multi-channel signal having five channels, two decoders according to FIG. 1 can be applied, where the first decoder processes the left channel and the right channel, the second decoder processes the left surround channel and the right surround channel, and a third mono decoder would be used for performing a mono-decoding of the center channel. Other groupings, however, or combinations of wave form coders and parametric coders can be applied as well. An alternative way to generalize the prediction scheme to more than two channels would be to treat three (or more) signals at the same time, i.e., to predict a 3rd combination signal from a 1st and a 2nd signal using two prediction coefficients, very similarly to the "two-to-three" module in MPEG Surround.

Additionally, the encoded multi-channel audio signal obtained at the input line 100 comprises a prediction direction indicator. This prediction direction indicator, such as a prediction direction flag, is extracted from the encoded multi-channel signal by the input interface 102 and is forwarded to the decoder calculator 116 so that the decoder calculator calculates the decoded multi-channel signal depending on the prediction information, the decoded first (or second) combination signal and the prediction direction indicator provided by the input interface 102.

The decoder calculator 116 is configured for calculating a decoded multi-channel signal having the decoded first channel signal 117 and the decoded second channel signal 118 using the decoded residual signal 114, the prediction information 108 and the decoded first combination signal 112. Particularly, the decoder calculator 116 is configured to operate in such a way that the decoded first channel signal and the decoded second channel signal are at least an approximation of a first channel signal and a second channel signal of the multi-channel signal input into a corresponding encoder, which are combined by the combination rule when generating the first combination signal and the prediction residual signal. Specifically, the prediction information on line 108 comprises a real-valued part different from zero and/or an imaginary part different from zero.

Figure 4A:
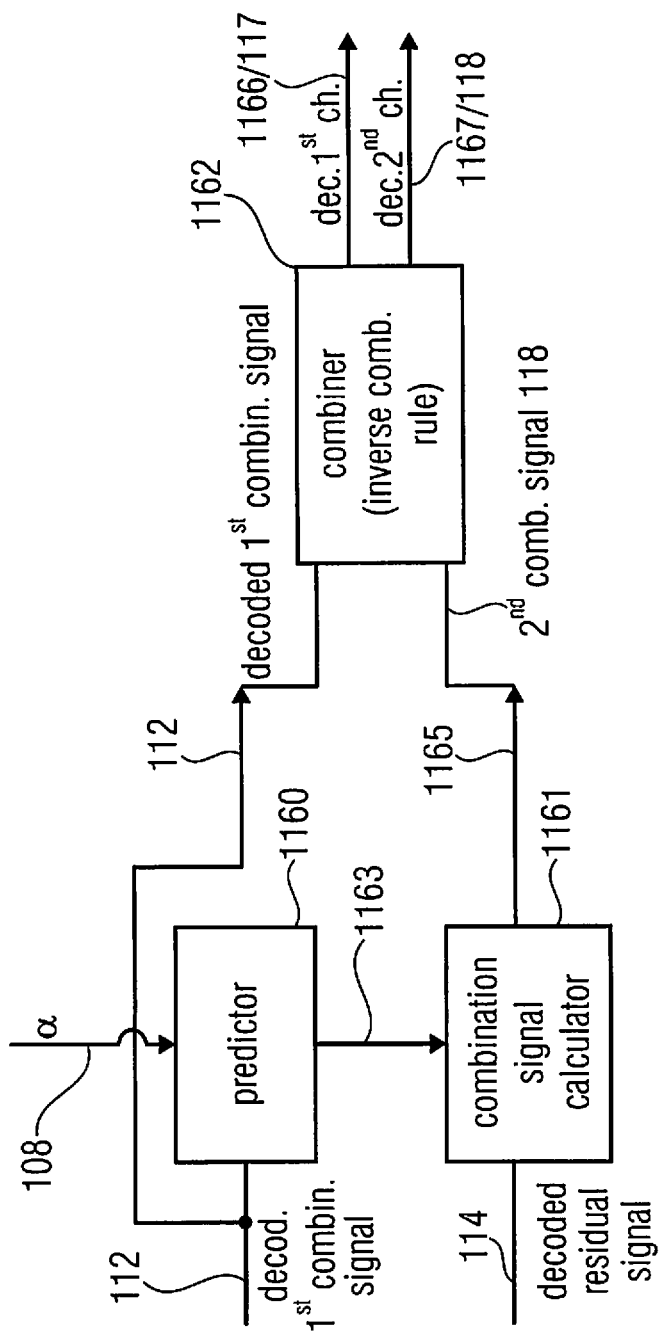
FIG. 4a illustrates an implementation of the decoder calculator of FIG. 1.

The decoder calculator 116 can be implemented in different manners. A first implementation is illustrated in FIG. 4a. This implementation comprises a predictor 1160, a combination signal calculator 1161 and a combiner 1162. The predictor receives the decoded first combination signal 112 and the prediction information 108 and outputs a prediction signal 1163. Specifically, the predictor 1160 is configured for applying the prediction information 108 to the decoded first combination signal 112 or a signal derived from the decoded first combination signal. The derivation rule for deriving the signal to which the prediction information 108 is applied may be a real-to-imaginary transform, or equally, an imaginary-to-real transform or a weighting operation, or depending on the implementation, a phase shift operation or a combined weighting/phase shift operation. The prediction signal 1163 is input together with the decoded residual signal into the combination signal calculator 1161 in order to calculate the decoded second combination signal 1165. The signals 112 and 1165 are both input into the combiner 1162, which combines the decoded first combination signal and the second combination signal to obtain the decoded multi-channel audio signal having the decoded first channel signal and the decoded second channel signal on output lines 1166 and 1167, respectively. Alternatively, the decoder calculator is implemented as a matrix calculator 1168 which receives, as input, the decoded first combination signal or signal M, the decoded residual signal or signal D and the prediction information α 108. The matrix calculator 1168 applies a transform matrix illustrated as 1169 to the signals M, D to obtain the output signals L, R, where L is the decoded first channel signal and R is the decoded second channel signal. The notation in FIG. 4b resembles a stereo notation with a left channel L and a right channel R. This notation has been applied in order to provide an easier understanding, but it is clear to those skilled in the art that the signals L, R can be any combination of two channel signals in a multi-channel signal having more than two channel signals. The matrix operation 1169 unifies the operations in blocks 1160, 1161 and 1162 of FIG. 4a into a kind of "single-shot" matrix calculation, and the inputs into the FIG. 4a circuit and the outputs from the FIG. 4a circuit are identical to the inputs into the matrix calculator 1168 or the outputs from the matrix calculator 1168.

Figure 4B:
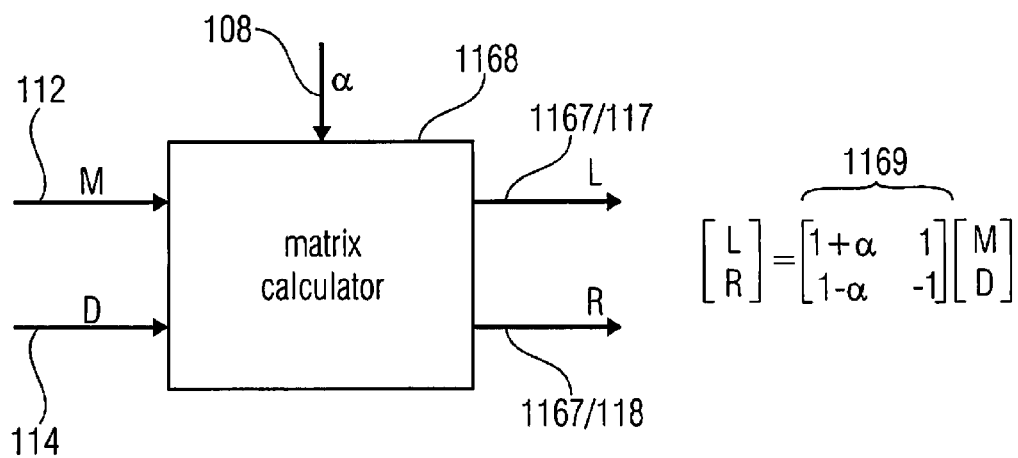
FIG. 4b illustrates an alternative implementation of the decoder calculator in form of a matrix calculator.
Figure 4C:
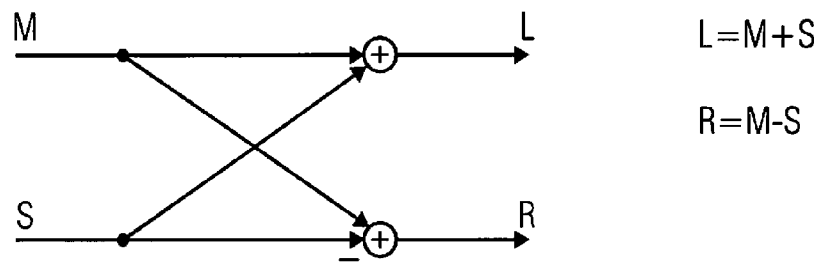
FIG. 4c illustrates a mid/side inverse combination rule corresponding to the combination rule illustrated in FIG. 3c.

FIG. 4c illustrates an example for an inverse combination rule applied by the combiner 1162 in FIG. 4a. Particularly, the combination rule is similar to the decoder-side combination rule in well-known mid/side coding, where L=M+S, and R=M−S. It is to be understood that the signal S used by the inverse combination rule in FIG. 4c is the signal calculated by the combination signal calculator, i.e. the combination of the prediction signal on line 1163 and the decoded residual signal on line 114. It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Figure 11A:
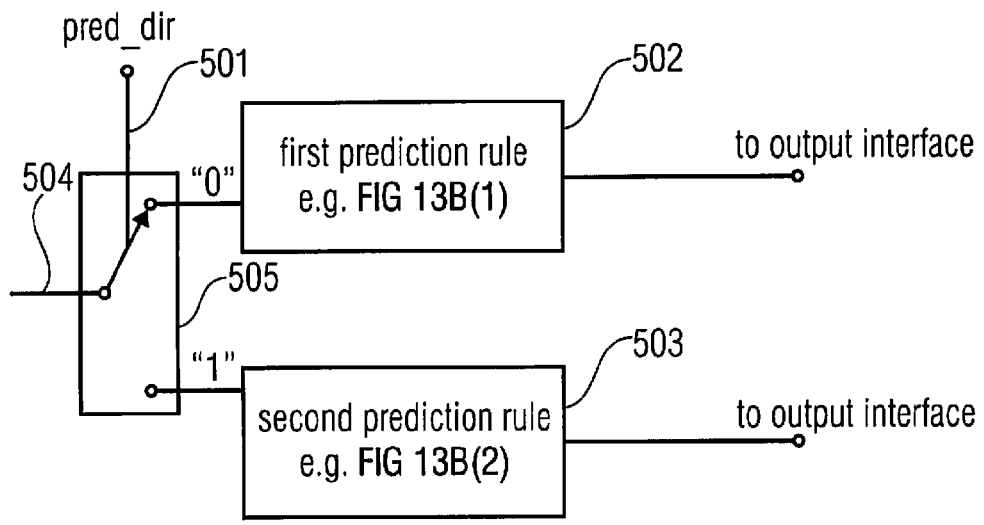
FIG. 11a illustrates an advantageous implementation of an audio encoder having a reversible prediction direction.
Figure 11B:
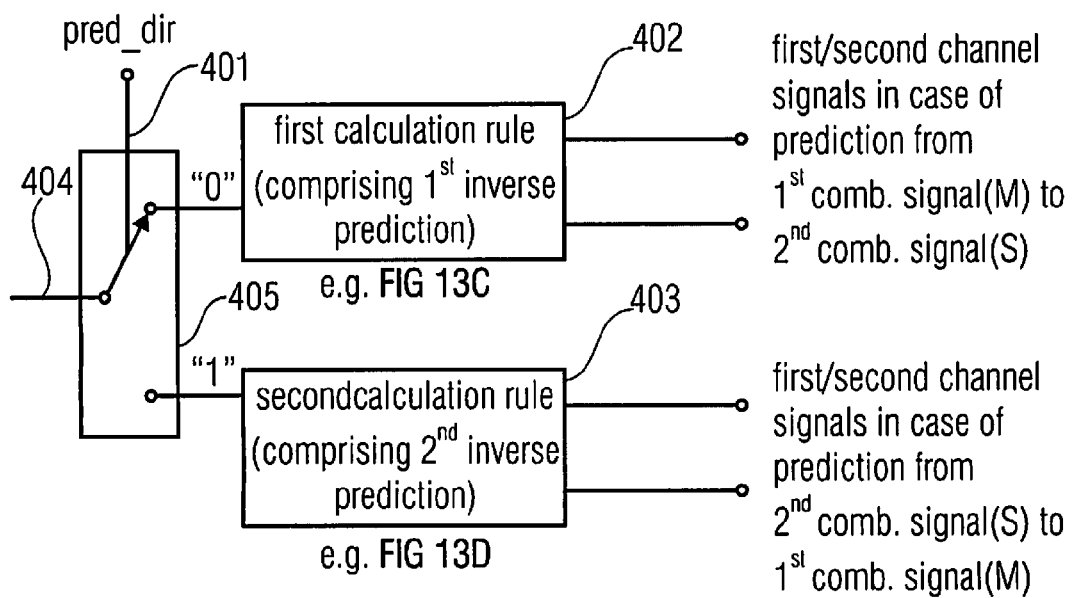
FIG. 11b illustrates an advantageous implementation of a related audio or video decoder having a capability for processing residual signals generated by reversible prediction directions.

FIG. 11b illustrates a further advantageous implementation of the decoder calculator operating dependent on the prediction direction indicator provided at a prediction direction indicator input 401. Depending on the state of the prediction direction indicator, either a first calculation rule illustrated at 402 or a second calculation rule illustrated at 403 is applied. The further calculation rule 402 provides, at an output, the first channel signal and the second channel signal and the first calculation rule can be implemented as illustrated in FIG. 13c described later. In a specific embodiment where the first combination signal is the mid signal and the second combination signal is the side signal, the prediction direction indicator has a value of "0", and the prediction is performed from the first combination signal to the second combination signal. In this case, the input 404 has the mid signal, i.e. the first combination signal. However, when the prediction direction indicator is equal to "1", then a switch 405 connects the input 404 to the input of the second calculation rule device 403. In this case, a prediction from the second combination signal such as the side signal to the first combination signal such as the mid signal is performed and the input 404 will have the side signal rather than the mid signal. The second calculation rule device 403 will, again, output the first channel signal and the second channel signal, but the rules for calculating these two signals, i.e. the left signal and the right signal in a stereo embodiment, will be different. A specific embodiment for the second calculation rule is illustrated in FIG. 13d discussed later.

Figure 2:
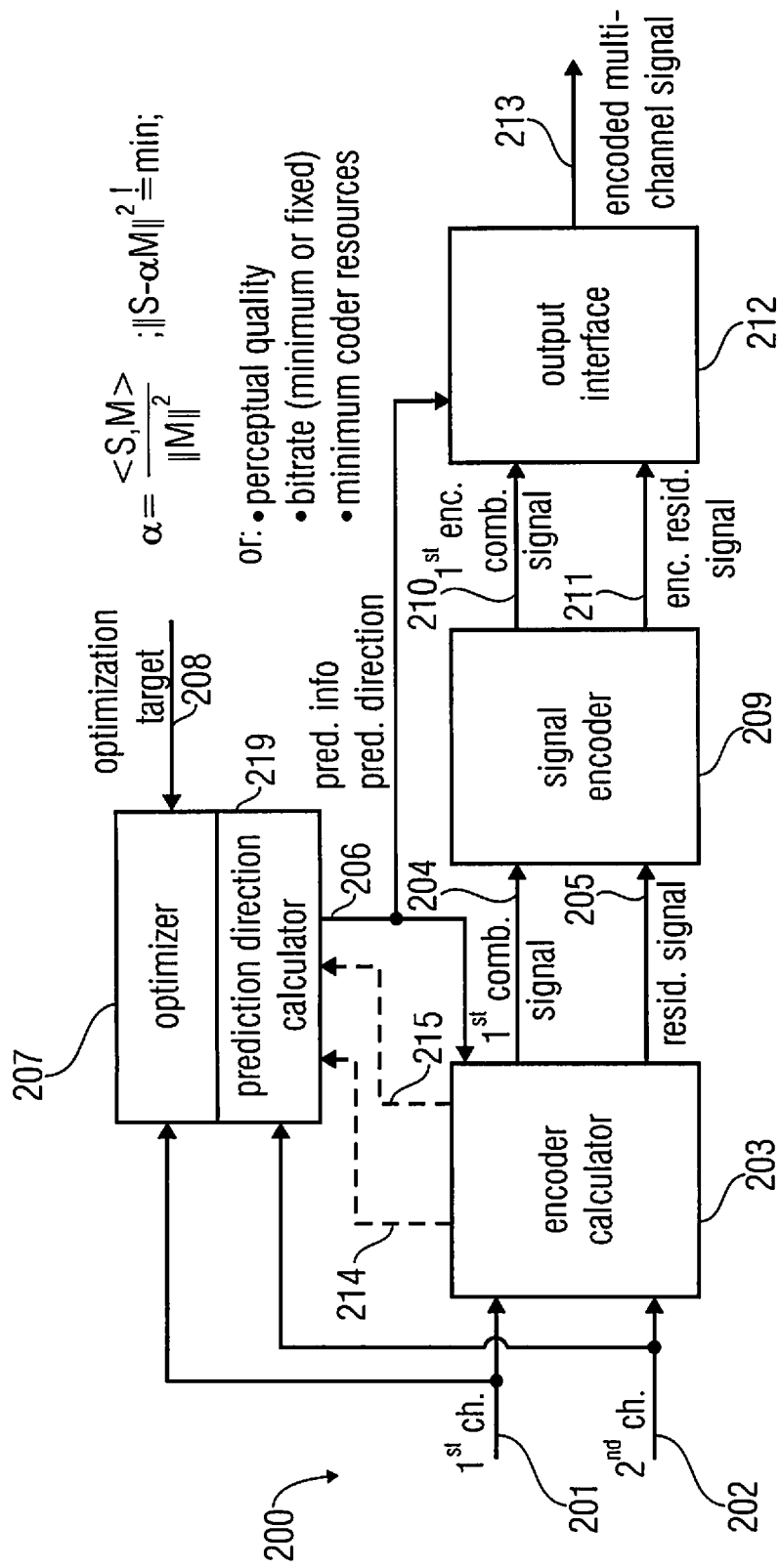
FIG. 2 is a block diagram of an embodiment of an audio or video encoder.

FIG. 2 illustrates an audio encoder for encoding a multi-channel audio signal 200 having two or more channel signals, where a first channel signal is illustrated at 201 and a second channel is illustrated at 202. Both signals are input into an encoder calculator 203 for calculating a first combination signal 204 and a prediction residual signal 205 using the first channel signal 201 and the second channel signal 202 and the prediction information 206, so that the prediction residual signal 205, when combined with a prediction signal derived from the first combination signal 204 and the prediction information 206 results in a second combination signal, where the first combination signal and the second combination signal are derivable from the first channel signal 201 and the second channel signal 202 using a combination rule.

The prediction information is generated by an optimizer 207 for calculating the prediction information 206 so that the prediction residual signal fulfills an optimization target 208. The first combination signal 204 and the residual signal 205 are input into a signal encoder 209 for encoding the first combination signal 204 to obtain an encoded first combination signal 210 and for encoding the residual signal 205 to obtain an encoded residual signal 211. Both encoded signals 210, 211 are input into an output interface 212 for combining the encoded first combination signal 210 with the encoded prediction residual signal 211 and the prediction information 206 to obtain an encoded multi-channel signal 213, which is similar to the encoded multi-channel signal 100 input into the input interface 102 of the audio decoder illustrated in FIG. 1.

Depending on the implementation, the optimizer 207 receives either the first channel signal 201 and the second channel signal 202, or as illustrated by lines 214 and 215, the first combination signal 214 and the second combination signal 215 derived from a combiner 2031 of FIG. 3a, which will be discussed later.

An advantageous optimization target is illustrated in FIG. 2, in which the coding gain is maximized, i.e. the bit rate is reduced as much as possible. In this optimization target, the residual signal D is minimized with respect to α. This means, in other words, that the prediction information α is chosen so that $\|S-\alpha M\|^2$ is minimized. This results in a solution for a illustrated in FIG. 2. The signals S, M are given in a block-wise manner and are advantageously spectral domain signals, where the notation $\| \ldots \|$ means the 2-norm of the argument, and where $< \ldots >$ illustrates the dot product as usual. When the first channel signal 201 and the second channel signal 202 are input into the optimizer 207, then the optimizer would have to apply the combination rule, where an exemplary combination rule is illustrated in FIG. 3c. When, however, the first combination signal 214 and the second combination signal 215 are input into the optimizer 207, then the optimizer 207 does not need to implement the combination rule by itself.

Other optimization targets may relate to the perceptual quality. An optimization target can be that a maximum perceptual quality is obtained. Then, the optimizer might use additional information from a perceptual model. Other implementations of the optimization target may relate to obtaining a minimum or a fixed bit rate. Then, the optimizer 207 would be implemented to perform a quantization/entropy-encoding operation in order to determine the bit rate that may be used for certain α values so that the α can be set to fulfill the requirements such as a minimum bit rate, or alternatively, a fixed bit rate. Other implementations of the optimization target can relate to a minimum usage of encoder or decoder resources. In case of an implementation of such an optimization target, information on the resources that may be used for a certain optimization would be available in the optimizer 207. Additionally, a combination of these optimization targets or other optimization targets can be applied for controlling the optimizer 207 which calculates the prediction information 206.

The audio encoder additionally comprises a prediction direction calculator 219 which provides, at its output, the prediction direction indicator indicating a prediction direction associated with the prediction residual signal 205 output by the encoder calculator 203 in FIG. 2. The prediction direction calculator 219 can be implemented in different ways, where several examples are discussed in the context of FIG. 14.

Figure 3A:
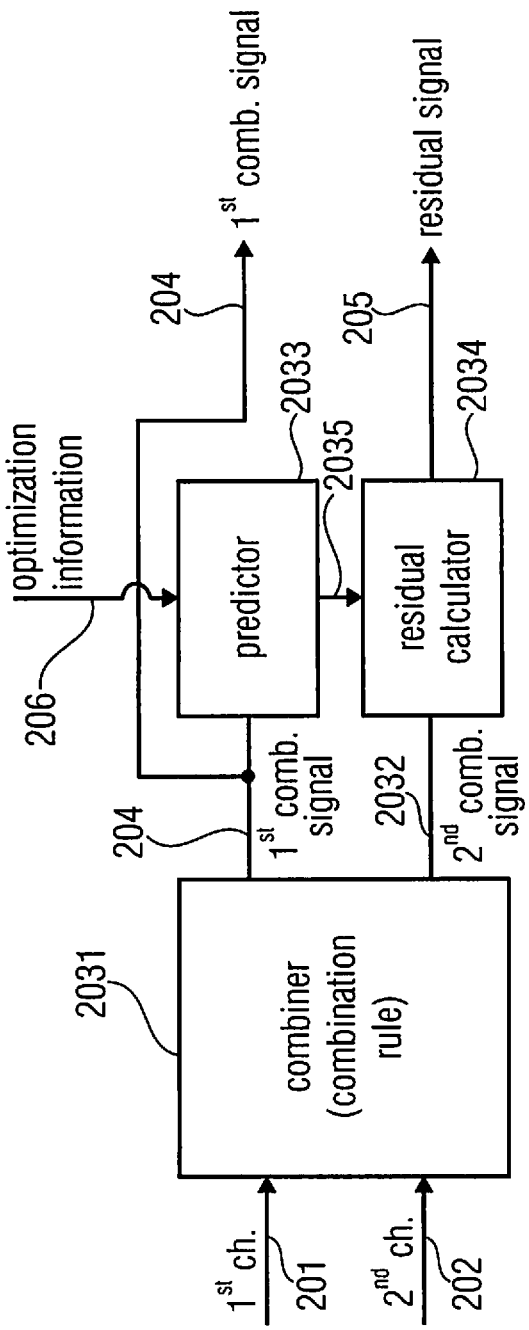
FIG. 3a illustrates an implementation of the encoder calculator of FIG. 2.
Figure 3B:
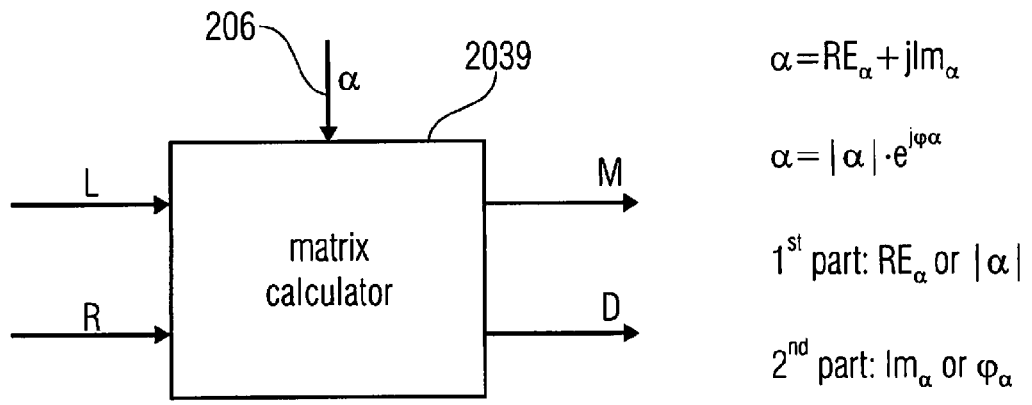
FIG. 3b illustrates an alternative implementation of the encoder calculator of FIG. 2.
Figure 3C:
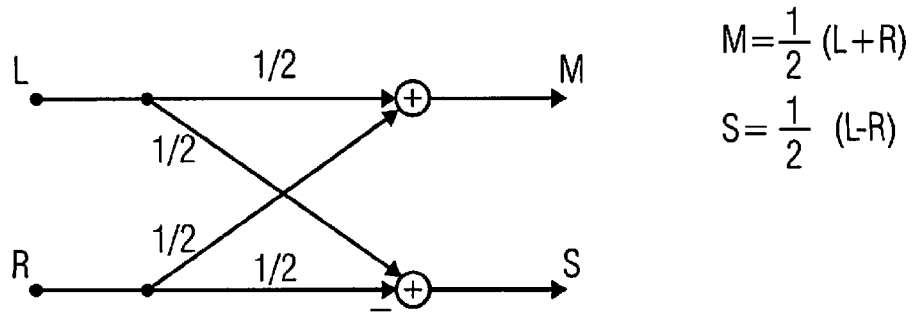
FIG. 3c illustrates a mid/side combination rule to be applied on the encoder side.

The encoder calculator 203 in FIG. 2 can be implemented in different ways, where an exemplary first implementation is illustrated in FIG. 3a, in which an explicit combination rule is performed in the combiner 2031. An alternative exemplary implementation is illustrated in FIG. 3b, where a matrix calculator 2039 is used. The combiner 2031 in FIG. 3a may be implemented to perform the combination rule illustrated in FIG. 3c, which is exemplarily the well-known mid/side encoding rule, where a weighting factor of 0.5 is applied to all branches. However, other weighting factors or no weighting factors at all (unity weighting) can be used depending on the implementation. Additionally, it is to be noted that other combination rules such as other linear combination rules or non-linear combination rules can be applied, as long as there exists a corresponding inverse combination rule which can be applied in the decoder combiner 1162 illustrated in FIG. 4a, which applies a combination rule that is inverse to the combination rule applied by the encoder. Due to the inventive prediction, any invertible prediction rule can be used, since the influence on the waveform is "balanced" by the prediction, i.e. any error is included in the transmitted residual signal, since the prediction operation performed by the optimizer 207 in combination with the encoder calculator 203 is a waveform-conserving process.

The combiner 2031 outputs the first combination signal 204 and a second combination signal 2032. The first combination signal is input into a predictor 2033, and the second combination signal 2032 is input into the residual calculator 2034. The predictor 2033 calculates a prediction signal 2035, which is combined with the second combination signal 2032 to finally obtain the residual signal 205. Particularly, the combiner 2031 is configured for combining the two channel signals 201 and 202 of the multi-channel audio signal in two different ways to obtain the first combination signal 204 and the second combination signal 2032, where the two different ways are illustrated in an exemplary embodiment in FIG. 3c. The predictor 2033 is configured for applying the prediction information to the first combination signal 204 or a signal derived from the first combination signal to obtain the prediction signal 2035. The signal derived from the combination signal can be derived by any non-linear or linear operation, where a real-to-imaginary transform/imaginary-to-real transform is advantageous, which can be implemented using a linear filter such as an FIR filter performing weighted additions of certain values.

The residual calculator 2034 in FIG. 3a may perform a subtraction operation so that the prediction signal is subtracted from the second combination signal. However, other operations in the residual calculator are possible. Correspondingly, the combination signal calculator 1161 in FIG. 4a may perform an addition operation where the decoded residual signal 114 and the prediction signal 1163 are added together to obtain the second combination signal 1165.

FIG. 11a illustrates an advantageous implementation of the encoder calculator. Depending on the prediction direction indicator input into the prediction direction input 501, either a first prediction rule 502 or a second prediction rule 503 is selected which is illustrated by a controlled selection switch 505. The first prediction rule can be similar to what is illustrated in FIG. 13b, first alternative, and the second prediction rule can be similar to what is illustrated in FIG. 13b, second alternative. The output of the blocks 502, 503, i.e. a combination signal and the residual signal, can be forwarded to the output interface, or in case of a signal encoding, to the signal encoder 209 in FIG. 2. Furthermore, the prediction direction indicator is input into the output bitstream together with the prediction information, the encoded residual signal and the encoded combination signal which can either be the first combination signal in case of a prediction direction indicator equal to "0", or a second combination signal in case of a prediction direction indicator equal to "1".

Figure 5A:
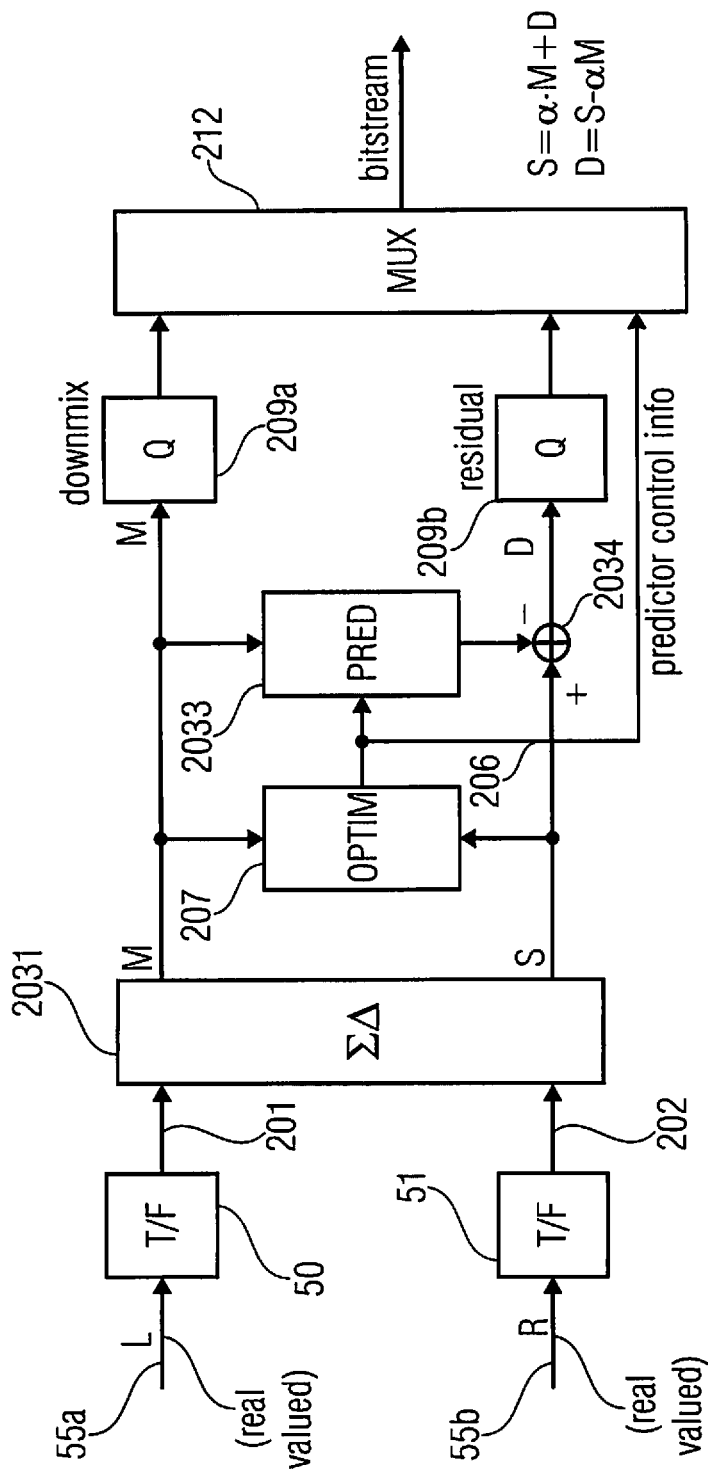
FIG. 5a illustrates an embodiment of an audio or video encoder operating in the frequency domain which is advantageously a real-valued frequency domain.

FIG. 5a illustrates an advantageous implementation of an audio encoder. Compared to the audio encoder illustrated in FIG. 3a, the first channel signal 201 is a spectral representation of a time domain first channel signal 55a. Correspondingly, the second channel signal 202 is a spectral representation of a time-domain channel signal 55b. The conversion from the time domain into the spectral representation is performed by a time/frequency converter 50 for the first channel signal and a time/frequency converter 51 for the second channel signal. Advantageously, but not necessarily, the spectral converters 50, 51 are implemented as real-valued converters. The conversion algorithm can be a discrete cosine transform (DCT), an FFT where only the real part is used, an MDCT or any other transform providing real-valued spectral values. Alternatively, both transforms can be implemented as an imaginary transform, such as a DST, an MDST or an FFT where only the imaginary part is used and the real part is discarded. Any other transform only providing imaginary values can be used as well. One purpose of using a pure real-valued transform or a pure imaginary transform is computational complexity, since, for each spectral value, only a single value such as magnitude or the real part has to be processed, or, alternatively, the phase or the imaginary part. In contrast, in a fully complex transform such as an FFT, two values, i.e., the real part and the imaginary part for each spectral line would have to be processed which is an increase of computational complexity by a factor of at least 2. Another reason for using a real-valued transform here is that such a transform is usually critically sampled, and hence provides a suitable (and commonly used) domain for signal quantization and entropy coding (the standard "perceptual audio coding" paradigm implemented in "MP3", AAC, or similar audio coding systems).

FIG. 5a additionally illustrates the residual calculator 2034 as an adder which receives the side signal at its "plus" input and which receives the prediction signal output by the predictor 2033 at its "minus" input. Additionally, FIG. 5a illustrates the situation that the predictor control information is forwarded from the optimizer to the multiplexer 212 which outputs a multiplexed bit stream representing the encoded multi-channel audio signal. Particularly, the prediction operation is performed in such a way that the side signal is predicted from the mid signal as illustrated by the Equations to the right of FIG. 5a.

While FIG. 5a illustrates a prediction from M to S, i.e. the side signal is predicted by the mid signal, which occurs for a prediction direction indicator equal to zero, a reversed prediction is applied when the prediction direction indicator is equal to 1. Then, a prediction from S to M is performed. This can be illustrated by swapping the outputs of block 2031 so that the upper output has the side signal and the lower output has the mid signal.

Advantageously, the predictor control information 206 is a factor as illustrated to the right in FIG. 3b. In an embodiment in which the prediction control information only comprises a real portion such as the real part of a complex-valued α or a magnitude of the complex-valued α, where this portion corresponds to a factor different from zero, a significant coding gain can be obtained when the mid signal and the side signal are similar to each other due to their waveform structure, but have different amplitudes.

When, however, the prediction control information only comprises a second portion which can be the imaginary part of a complex-valued factor or the phase information of the complex-valued factor, where the imaginary part or the phase information is different from zero, the present invention achieves a significant coding gain for signals which are phase shifted to each other by a value different from 0° of 180°, and which have, apart from the phase shift, similar waveform characteristics and similar amplitude relations.

Advantageously, a prediction control information is complex-valued. Then, a significant coding gain can be obtained for signals being different in amplitude and being phase shifted. In a situation in which the time/frequency transforms provide complex spectra, the operation 2034 would be a complex operation in which the real part of the predictor control information is applied to the real part of the complex spectrum M and the imaginary part of the complex prediction information is applied to the imaginary part of the complex spectrum. Then, in adder 2034, the result of this prediction operation is a predicted real spectrum and a predicted imaginary spectrum, and the predicted real spectrum would be subtracted from the real spectrum of the side signal S (bandwise), and the predicted imaginary spectrum would be subtracted from the imaginary part of the spectrum of S to obtain a complex residual spectrum D.

The time-domain signals L and R are real-valued signals, but the frequency-domain signals can be real- or complex-valued. When the frequency-domain signals are real-valued, then the transform is a real-valued transform. When the frequency-domain signals are complex-valued, then the transform is a complex-valued transform. This means that the input to the time-to-frequency and the output of the frequency-to-time transforms are real-valued, while the frequency-domain signals could e.g. be complex-valued QMF-domain signals.

Figure 5B:
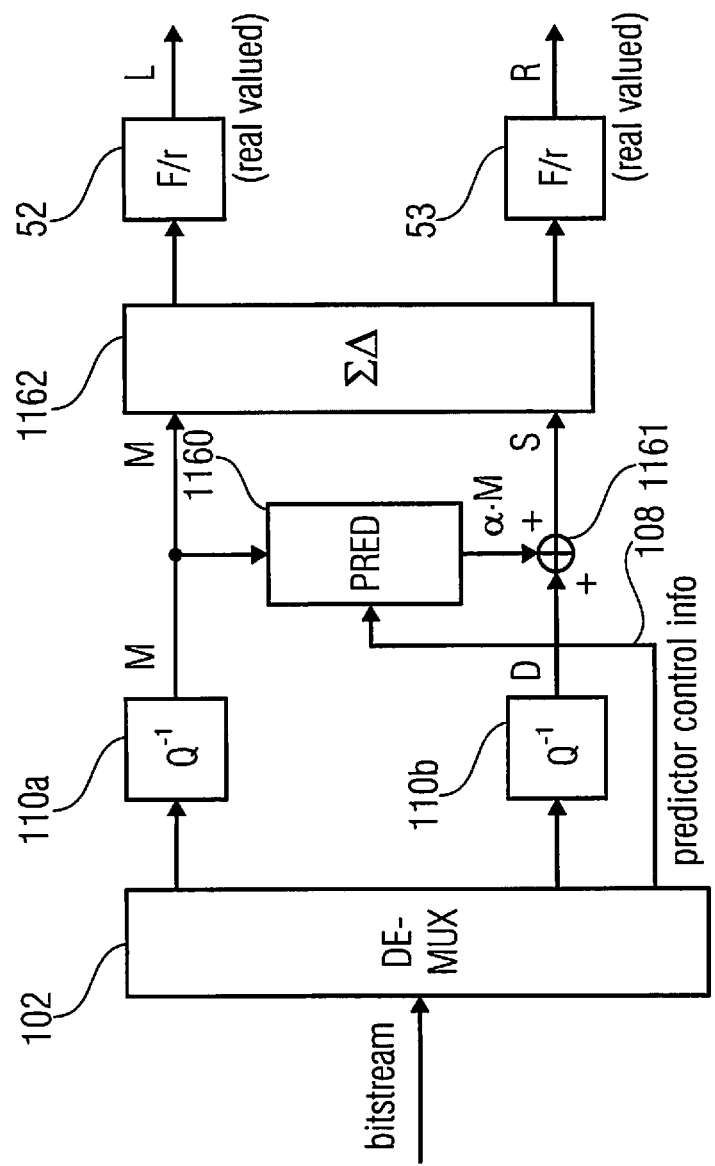
FIG. 5b illustrates an implementation of an audio or video decoder operating in the frequency domain.

FIG. 5b illustrates an audio decoder corresponding to the audio encoder illustrated in FIG. 5a. Similar elements with respect to the FIG. 1 audio decoder have similar reference numerals.

The bitstream output by bitstream multiplexer 212 in FIG. 5a is input into a bitstream demultiplexer 102 in FIG. 5b. The bitstream demultiplexer 102 demultiplexes the bitstream into the downmix signal M and the residual signal D. The downmix signal M is input into a dequantizer 110a. The residual signal D is input into a dequantizer 110b. Additionally, the bitstream demultiplexer 102 demultiplexes a predictor control information 108 from the bitstream and inputs same into the predictor 1160. The predictor 1160 outputs a predicted side signal α·M and the combiner 1161 combines the residual signal output by the dequantizer 110b with the predicted side signal in order to finally obtain the reconstructed side signal S. The signal is then input into the combiner 1162 which performs, for example, a sum/difference processing, as illustrated in FIG. 4c with respect to the mid/side encoding. Particularly, block 1162 performs an (inverse) mid/side decoding to obtain a frequency-domain representation of the left channel and a frequency-domain representation of the right channel. The frequency-domain representation is then converted into a time-domain representation by corresponding frequency/time converters 52 and 53.

FIG. 5b illustrates the situation where the prediction has been done, in the encoder, from the mid signal M to the side signal S indicated by the prediction direction indicator equal to zero. However, when a prediction direction indicator equal to 1 is transmitted from the encoder such as the encoder in FIG. 5a to the decoder in FIG. 5b, then an inverse prediction from S to M has to be performed, i.e. the decoder calculation rule is such that M is calculated from S rather than the opposite calculation in the case of a prediction direction indicator equal to zero.

Depending on the implementation of the system, the frequency/time converters 52, 53 are real-valued frequency/time converters when the frequency-domain representation is a real-valued representation, or complex-valued frequency/time converters when the frequency-domain representation is a complex-valued representation.

Figure 6A:
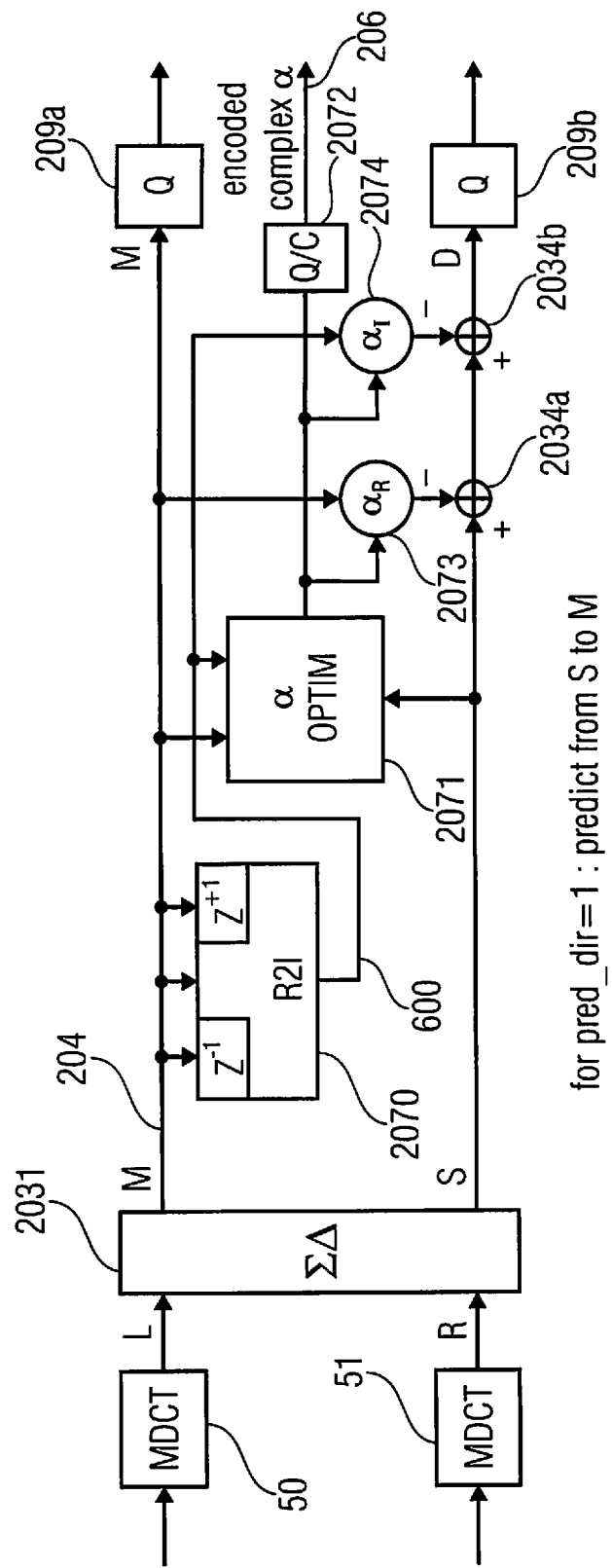
FIG. 6a illustrates an alternative implementation of an audio or video encoder operating in the MDCT domain and using a real-to-imaginary transform.

For increasing efficiency, however, performing a real-valued transform is advantageous as illustrated in another implementation in FIG. 6a for the encoder and FIG. 6b for the decoder. The real-valued transforms 50 and 51 are implemented by an MDCT. Additionally, the prediction information is calculated as a complex value having a real part and an imaginary part. Since both spectra M, S are real-valued spectra, and since, therefore, no imaginary part of the spectrum exists, a real-to-imaginary converter 2070 is provided which calculates an estimated imaginary spectrum 600 from the real-valued spectrum of signal M. This real-to-imaginary transformer 2070 is a part of the optimizer 207, and the imaginary spectrum 600 estimated by block 2070 is input into the α optimizer stage 2071 together with the real spectrum M in order to calculate the prediction information 206, which now has a real-valued factor indicated at 2073 and an imaginary factor indicated at 2074. Now, in accordance with this embodiment, the real-valued spectrum of the first combination signal M is multiplied by the real part $\alpha_R$ 2073 to obtain the prediction signal which is then subtracted from the real-valued side spectrum. Additionally, the imaginary spectrum 600 is multiplied by the imaginary part $\alpha_I$ illustrated at 2074 to obtain the further prediction signal, where this prediction signal is then subtracted from the real-valued side spectrum as indicated at 2034b. Then, the prediction residual signal D is quantized in quantizer 209b, while the real-valued spectrum of M is quantized/encoded in block 209a. Additionally, it is advantageous to quantize and encode the prediction information α in the quantizer/entropy encoder 2072 to obtain the encoded complex α value which is forwarded to the bit stream multiplexer 212 of FIG. 5a, for example, and which is finally input into a bit stream as the prediction information.

Concerning the position of the quantization/coding (Q/C) module 2072 for α, it is noted that the multipliers 2073 and 2074 advantageously use exactly the same (quantized) a that will be used in the decoder as well. Hence, one could move 2072 directly to the output of 2071, or one could consider that the quantization of α is already taken into account in the optimization process in 2071.

Although one could calculate a complex spectrum on the encoder side, since all information is available, it is advantageous to perform the real-to-complex transform in block 2070 in the encoder so that similar conditions with respect to a decoder illustrated in FIG. 6b are produced. The decoder receives a real-valued encoded spectrum of the first combination signal and a real-valued spectral representation of the encoded residual signal. Additionally, an encoded complex prediction information is obtained at 108, and an entropy-decoding and a dequantization is performed in block 65 to obtain the real part $\alpha_R$ illustrated at 1160b and the imaginary part $\alpha_I$ illustrated at 1160c. The mid signals output by weighting elements 1160b and 1160c are added to the decoded and dequantized prediction residual signal. Particularly, the spectral values input into weighter 1160c, where the imaginary part of the complex prediction factor is used as the weighting factor, are derived from the real-valued spectrum M by the real-to-imaginary converter 1160a, which is advantageously implemented in the same way as block 2070 from FIG. 6a relating to the encoder side. On the decoder side, a complex-valued representation of the mid signal or the side signal is not available, which is in contrast to the encoder side. The reason is that only encoded real-valued spectra have been transmitted from the encoder to the decoder due to bit rate and complexity reasons.

FIG. 6a and FIG. 6b illustrate the situation, where the prediction direction indicator is equal to zero, i.e. where a prediction from M to S or a calculation of S using M and the complex prediction information α is performed. When, however, the prediction direction indicator is equal to 1, or stated generally, indicates a reverse prediction direction, then the same circuit can be applied, but the outputs of block 2031 are exchanged so that the upper line has the side signal S and the lower line has the mid signal M. On the decoder side, the decoder calculation rule is changed as well so that, in the case of a reverse prediction direction, M is calculated from S which can also be indicated by replacing the M signal in FIG. 6b at the upper line at the output of block 110a by the side signal S. This results in a mid signal M at the output of block 1161b and the side signal S at the upper input of block 1162. Therefore, either the rule applied by block 1162 has to be adapted to this different input situation, or the M/S signals have to be swapped before being input into block 1162. In the latter case, i.e. when a swapping is performed, block 1162 is the same for both prediction direction indicator values.

The real-to-imaginary transformer 1160a or the corresponding block 2070 of FIG. 6a can be implemented as published in WO 2004/013839 A1 or WO 2008/014853 A1 or U.S. Pat. No. 6,980,933. Depending on the signal or the implementation, the prediction information α can be pure real-valued or pure imaginary-valued or can be a complex number having a real part and an imaginary part. However, if only real-valued prediction is implemented, the prediction direction reversal will already provide an improved performance with very limited additional computing requirements and will result in a lower bitrate due to the fact that the residual signal will have smaller energy, and the same is true for the prediction information as well. Hence, the additional bitrate that may be used for transmitting the prediction direction indicator, in the end results in considerable bit savings due to the lower bitrate that may be used for the residual signal and the prediction information. Therefore, the prediction information can comprise a real-valued portion different from zero and/or an imaginary portion different from zero. Alternatively, any other implementation known in the art can be applied, and an advantageous implementation is discussed in the context of FIGS. 10a, 10b.

Figure 10A:
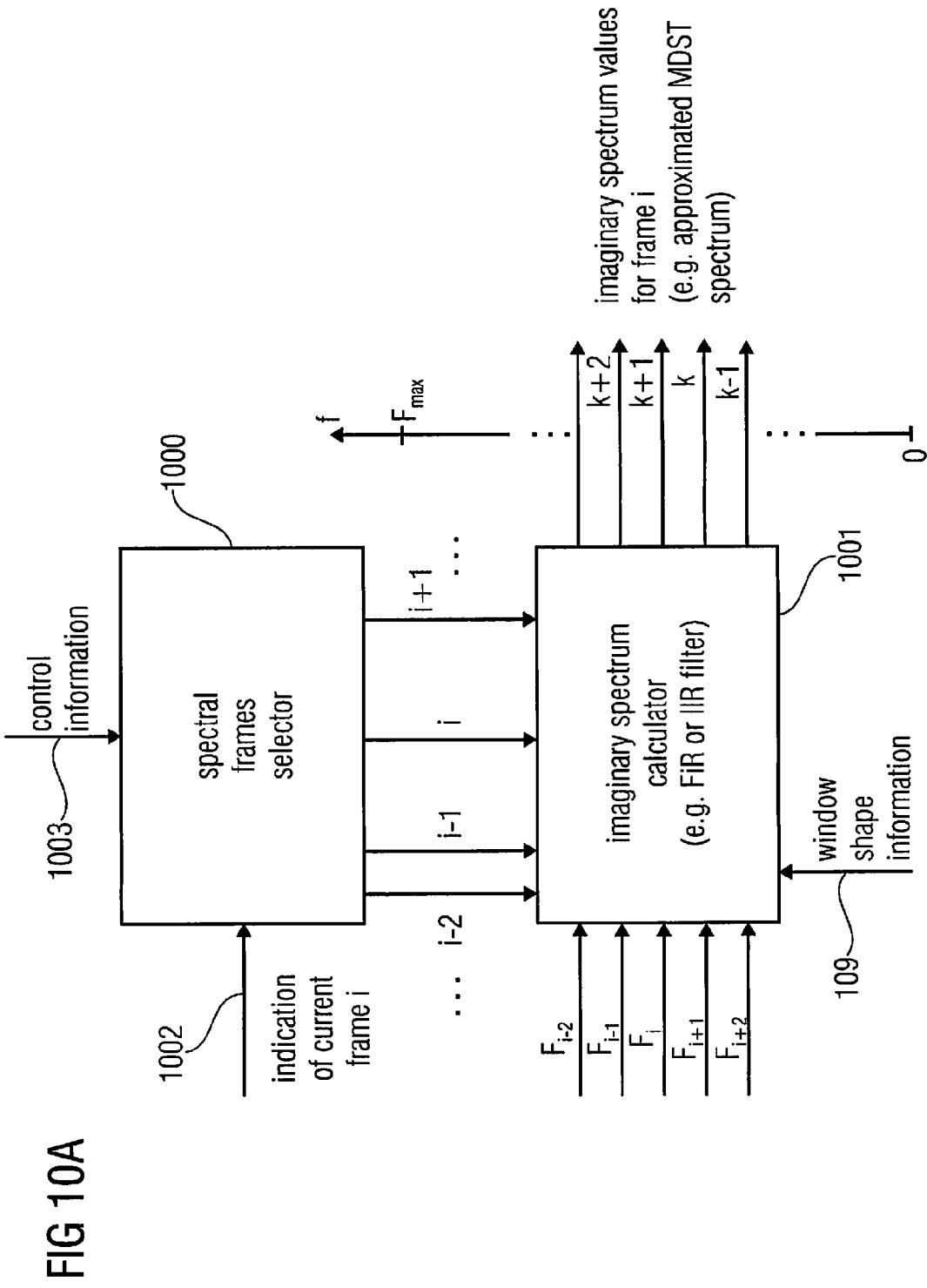
FIG. 10a illustrates an implementation of the real-to-imaginary transformer in FIG. 6a or FIG. 6b.

Specifically, as illustrated in FIG. 10a, the real-to-imaginary converter 1160a comprises a spectral frame selector 1000 connected to an imaginary spectrum calculator 1001. The spectral frame selector 1000 receives an indication of a current frame i at input 1002 and, depending on the implementation, control information at a control input 1003. When, for example, the indication on line 1002 indicates that an imaginary spectrum for a current frame i is to be calculated, and when the control information 1003 indicates that only the current frame is to be used for that calculation, then the spectral frame selector 1000 only selects the current frame i and forwards this information to the imaginary spectrum calculator. Then, the imaginary spectrum calculator only uses the spectral lines of the current frame i to perform a weighted combination of lines positioned in the current frame (block 1008), with respect to frequency, close to or around the current spectral line k, for which an imaginary line is to be calculated as illustrated at 1004 in FIG. 10b. When, however, the spectral frame selector 1000 receives a control information 1003 indicating that the preceding frame i−1 and the following frame i+1 are to be used for the calculation of the imaginary spectrum as well, then the imaginary spectrum calculator additionally receives the values from frames i−1 and i+1 and performs a weighted combination of the lines in the corresponding frames as illustrated at 1005 for frame i−1 and at 1006 for frame i+1. The results of the weighting operations are combined by a weighted combination in block 1007 to finally obtain an imaginary line k for the frame $f_i$ which is then multiplied by the imaginary part of the prediction information in element 1160c to obtain the prediction signal for this line which is then added to the corresponding line of the mid signal in adder 1161b for the decoder. In the encoder, the same operation is performed, but a subtraction in element 2034b is done.

It has to be noted that the control information 1003 can additionally indicate to use more frames than the two surrounding frames or to, for example, only use the current frame and exactly one or more preceding frames but not using "future" frames in order to reduce the systematic delay.

Figure 10B:
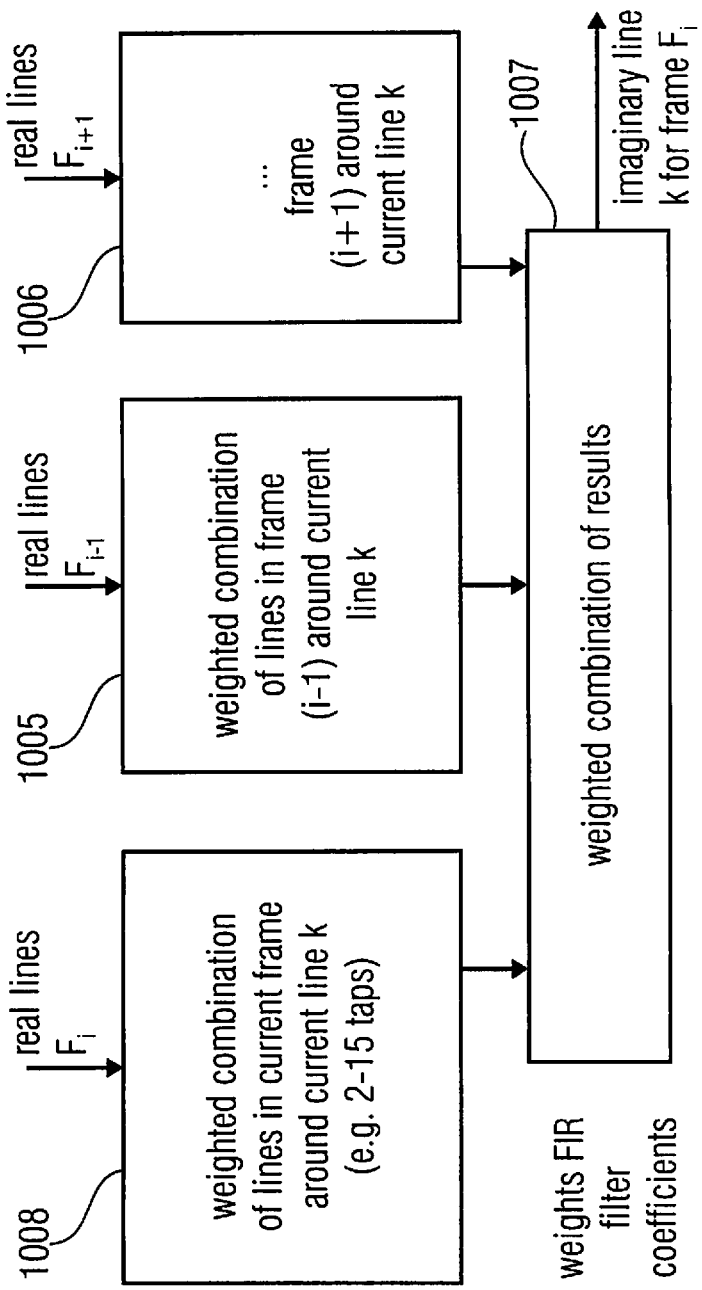

Additionally, it is to be noted that the stage-wise weighted combination illustrated in FIG. 10b, in which, in a first operation, the lines from one frame are combined and, subsequently, the results from these frame-wise combination operations are combined by themselves can also be performed in the other order. The other order means that, in a first step, the lines for the current frequency k from a number of adjacent frames indicated by control information 103 are combined by a weighted combination. This weighted combination is done for the lines k, k−1, k−2, k+1, k+2 etc. depending on the number of adjacent lines to be used for estimating the imaginary line. Then, the results from these "time-wise" combinations are subjected to a weighted combination in the "frequency direction" to finally obtain the imaginary line k for the frame $f_i$. The weights are set to be valued between −1 and 1, advantageously, and the weights can be implemented in a straight-forward FIR or IIR filter combination which performs a linear combination of spectral lines or spectral signals from different frequencies and different frames.

As indicated in FIGS. 6a and 6b, the advantageous transform algorithm is the MDCT transform algorithm which is applied in the forward direction in elements 50 and 51 in FIG. 6a and which is applied in the backward direction in elements 52, 53, subsequent to a combination operation in the combiner 1162 operating in the spectral domain.

FIG. 8a illustrates a more detailed implementation of block 50 or 51. Particularly, a sequence of time-domain audio samples is input into an analysis windower 500 which performs a windowing operation using an analysis window and, particularly, performs this operation in a frame by frame manner, but using a stride or overlap of 50%. The result of the analysis windower, i.e., a sequence of frames of windowed samples, is input into an MDCT transform block 501, which outputs the sequence of real-valued MDCT frames, where these frames are aliasing-affected. Exemplarily, the analysis windower applies analysis windows having a length of 2048 samples. Then, the MDCT transform block 501 outputs MDCT spectra having 1024 real spectral lines or MDCT values. Advantageously, the analysis windower 500 and/or the MDCT transformer 501 are controllable by a window length or transform length control 502 so that, for example, for transient portions in the signal, the window length/transform length is reduced in order to obtain better coding results.

FIG. 8b illustrates the inverse MDCT operation performed in blocks 52 and 53. Exemplarily, block 52 comprises a block 520 for performing a frame-by-frame inverse MDCT transform. When, for example, a frame of MDCT values has 1024 values, then the output of this MDCT inverse transform has 2048 aliasing-affected time samples. Such a frame is supplied to a synthesis windower 521, which applies a synthesis window to this frame of 2048 samples. The windowed frame is then forwarded to an overlap/add processor 522 which, exemplarily, applies a 50% overlap between two subsequent frames and, then, performs a sample by sample addition so that a 2048 samples block finally results in 1024 new samples of the aliasing free output signal. Again, it is advantageous to apply a window/transform length control using information which is, for example, transmitted in the side information of the encoded multi-channel signal as indicated at 523.

Figure 9A:
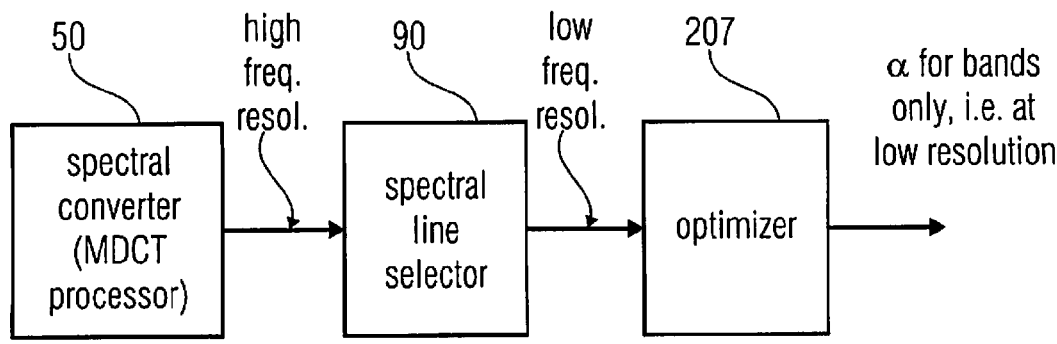
FIG. 9a illustrates an implementation of an optimizer operating on reduced resolution with respect to the MDCT output.

The α prediction values could be calculated for each individual spectral line of an MDCT spectrum. However, it has been found that this is not necessary and a significant amount of side information can be saved by performing a band-wise calculation of the prediction information. Stated differently, a spectral converter 50 illustrated in FIG. 9 which is, for example, an MDCT processor as discussed in the context of FIG. 8a provides a high-frequency resolution spectrum having certain spectral lines illustrated in FIG. 9b. This high frequency resolution spectrum is used by a spectral line selector 90 that provides a low frequency resolution spectrum which comprises certain bands B1, B2, B3, . . . , BN. This low frequency resolution spectrum is forwarded to the optimizer 207 for calculating the prediction information so that a prediction information is not calculated for each spectral line, but only for each band. To this end, the optimizer 207 receives the spectral lines per band and calculates the optimization operation starting from the assumption that the same α value is used for all spectral lines in the band.

Figure 9B:
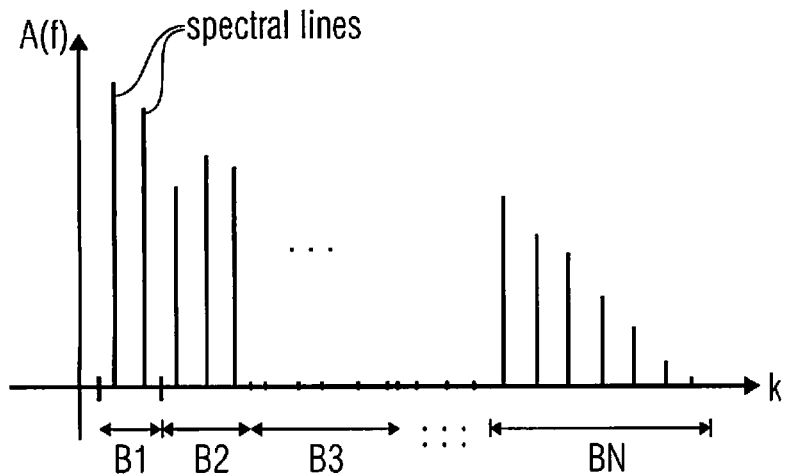
FIG. 9b illustrates a representation of an MDCT spectrum and the corresponding lower resolution bands in which the prediction information is calculated.

Advantageously, the bands are shaped in a psychoacoustic way so that the bandwidth of the bands increases from lower frequencies to higher frequencies as illustrated in FIG. 9b. Alternatively, although not as advantageous as the increasing bandwidth implementation, equally-sized frequency bands could be used as well, where each frequency band has at least two or typically many more, such as at least 30 frequency lines. Typically, for a 1024 spectral lines spectrum, less than 30 complex α values, and advantageously, more than 5α values are calculated. For spectra with less than 1024 spectral lines (e.g. 128 lines), advantageously, less frequency bands (e.g. 6) are used for α.

For calculating the α values the high resolution MDCT spectrum is not necessarily required. Alternatively, a filter bank having a frequency resolution similar to the resolution that may be used for calculating the α values can be used as well. When bands increasing in frequency are to be implemented, then this filterbank should have varying bandwidth. When, however, a constant bandwidth from low to high frequencies is sufficient, then a traditional filter bank with equi-width sub-bands can be used.

Depending on the implementation, the sign of the α value indicated in FIG. 3b or 4b can be reversed. To remain consistent, however, it is useful that this reversion of the sign is used on the encoder side as well as on the decoder side. Compared to FIG. 6a, FIG. 5a illustrates a generalized view of the encoder, where item 2033 is a predictor that is controlled by the predictor control information 206, which is determined in item 207 and which is embedded as side information in the bitstream. Instead of the MDCT used in FIG. 6a in blocks 50, 51, a generalized time/frequency transform is used in FIG. 5a as discussed. As outlined earlier, FIG. 6a is the encoder process which corresponds to the decoder process in FIG. 6b, where L stands for the left channel signal, R stands for the right channel signal, M stands for the mid signal or downmix signal, S stands for the side signal and D stands for the residual signal. Alternatively, L is also called the first channel signal 201, R is also called the second channel signal 202, M is also called the first combination signal 204 and S is also called the second combination signal 2032.

Advantageously, the modules 2070 in the encoder and 1160a in the decoder should exactly match in order to ensure correct waveform coding. This applies advantageously to the case, in which these modules use some form of approximation such as truncated filters or when it is only made use of one or two instead of the three MDCT frames, i.e. the current MDCT frame on line 60, the preceding MDCT frame on line 61 and the next MDCT frame on line 62.

Additionally, it is advantageous that the module 2070 in the encoder in FIG. 6a uses the non-quantized MDCT spectrum M as input, although the real-to-imaginary (R2I) module 1160a in the decoder has only the quantized MDCT spectrum available as input. Alternatively, one can also use an implementation in which the encoder uses the quantized MDCT coefficients as an input into the module 2070. However, using the non-quantized MDCT spectrum as input to the module 2070 is the advantageous approach from a perceptual point of view.

Subsequently, several aspects of embodiments of the present invention are discussed in more detail.

Standard parametric stereo coding, such as the MPEG Surround (MPS) based stereo coding in the USAC system, relies on the capability of the oversampled complex (hybrid) QMF domain to allow for time- and frequency-varying perceptually motivated signal processing without introducing aliasing artifacts. However, in case of downmix/residual coding (as used for the high bit rates considered here), the resulting unified stereo coder acts as a waveform coder. This allows operation in a critically sampled domain, like the MDCT domain, since the waveform coding paradigm ensures that the aliasing cancellation property of the MDCT-IMDCT processing chain is sufficiently well preserved.

However, to be able to exploit the improved coding efficiency that can be achieved in case of stereo signals with inter-channel time- or phase-differences by means of a complex-valued prediction coefficient α, a complex-valued frequency-domain representation of the downmix signal DMX may be used as input to the complex-valued upmix matrix. This can be obtained by using an MDST transform in addition to the MDCT transform for the DMX signal. The MDST spectrum can be computed (exactly or as an approximation) from the MDCT spectrum.

Furthermore, the parameterization of the upmix matrix can be simplified by transmitting the complex prediction coefficient α instead of MPS parameters. Hence, only two parameters (real and imaginary part of α) are transmitted instead of three (ICC, CLD, and IPD). This is possible because of redundancy in the MPS parameterization in case of downmix/residual coding. The MPS parameterization includes information about the relative amount of decorrelation to be added in the decoder (i.e., the energy ratio between the RES and the DMX signals), and this information is redundant when the actual DMX and RES signals are transmitted.

Because of the same reason, a gain factor is obsolete in case of downmix/residual coding. Hence, the upmix matrix for downmix/residual coding with complex prediction is now:

$$\begin{bmatrix} L \\ R \end{bmatrix} = \begin{bmatrix} 1-\alpha & 1 \\ 1+\alpha & -1 \end{bmatrix} \begin{bmatrix} DMX \\ RES \end{bmatrix}.$$

Compared to Equation 1169 in FIG. 4b, the sign of α is inverted in this equation, and DMX=M and RES=D. This is, therefore, an alternative implementation/notation with respect to FIG. 4b.

Two options are available for calculating the prediction residual signal in the encoder. One option is to use the quantized MDCT spectral values of the downmix. This would result in the same quantization error distribution as in M/S coding since encoder and decoder use the same values to generate the prediction. The other option is to use the non-quantized MDCT spectral values. This implies that encoder and decoder will not use the same data for generating the prediction, which allows for spatial redistribution of the coding error according to the instantaneous masking properties of the signal at the cost of a somewhat reduced coding gain.

It is advantageous to compute the MDST spectrum directly in the frequency domain by means of two-dimensional FIR filtering of three adjacent MDCT frames as discussed. The latter can be considered as a "real-to-imaginary" (R2I) transform. The complexity of the frequency-domain computation of the MDST can be reduced in different ways, which means that only an approximation of the MDST spectrum is calculated:

Limiting the number of FIR filter taps.
Estimating the MDST from the current MDCT frame only.
Estimating the MDST from the current and previous MDCT frame.

As long as the same approximation is used in the encoder and decoder, the waveform coding properties are not affected. Such approximations of the MDST spectrum, however, can lead to a reduction in the coding gain achieved by complex prediction.

If the underlying MDCT coder supports window-shape switching, the coefficients of the two-dimensional FIR filter used to compute the MDST spectrum have to be adapted to the actual window shapes. The filter coefficients applied to the current frame's MDCT spectrum depend on the complete window, i.e. a set of coefficients may be used for every window type and for every window transition. The filter coefficients applied to the previous/next frame's MDCT spectrum depend only on the window half overlapping with the current frame, i.e. for these a set of coefficients may be used only for each window type (no additional coefficients for transitions).

If the underlying MDCT coder uses transform-length switching, including the previous and/or next MDCT frame in the approximation becomes more complicated around transitions between the different transforms lengths. Due to the different number of MDCT coefficients in the current and previous/next frame, the two-dimensional filtering is more complicated in this case. To avoid increasing computational and structural complexity, the previous/next frame can be excluded from the filtering at transform-length transitions, at the price of reduced accuracy of the approximation for the respective frames.

Furthermore, special care needs to be taken for the lowest and highest parts of the MDST spectrum (close to DC and fs/2), where less surrounding MDCT coefficients are available for FIR filtering than may be used. Here the filtering process needs to be adapted to compute the MDST spectrum correctly. This can either be done by using a symmetric extension of the MDCT spectrum for the missing coefficients (according to the periodicity of spectra of time discrete signals), or by adapting filter coefficients accordingly. The handling of these special cases can of course be simplified at the price of a reduced accuracy in vicinity of the borders of the MDST spectrum.

Computing the exact MDST spectrum from the transmitted MDCT spectra in the decoder increases the decoder delay by one frame (here assumed to be 1024 samples). The additional delay can be avoided by using an approximation of the MDST spectrum that does not require the MDCT spectrum of the next frame as an input.

The following bullet list summarizes the advantages of the MDCT-based unified stereo coding over QMF-based unified stereo coding:

Only small increase in computational complexity (when SBR is not used).
Scales up to perfect reconstruction if MDCT spectra are not quantized. Note that this is not the case for QMF-based unified stereo coding.
Natural unification and extension of M/S coding and intensity stereo coding.

Cleaner architecture that simplifies encoder tuning, since stereo signal processing and quantization/coding can be tightly coupled. Note that in QMF-based unified stereo coding, MPS frames and MDCT frames are not aligned and that scale factor bands don't match MPS parameter bands.

Efficient coding of stereo parameters, since only two parameters (complex α) instead of three parameters as in MPEG Surround (ICC, CLD, IPD) have to be transmitted.

No additional decoder delay if the MDST spectrum is computed as an approximation (without using the next frame).

Important properties of an implementation can be summarized as follows:

a) MDST spectra are computed by means of two-dimensional FIR filtering from current, previous, and next MDCT spectra. Different complexity/quality trade-offs for the MDST computation (approximation) are possible by reducing the number of FIR filter taps and/or the number of MDCT frames used. In particular, if an adjacent frame is not available because of frame loss during transmission or transform-length switching, that particular frame is excluded from the MDST estimation. For the case of transform-length switching the exclusion is signaled in the bitstream.

b) Only two parameters, the real and imaginary part of the complex prediction coefficient α, are transmitted instead of ICC, CLD, and IPD. The real and imaginary parts of a are handled independently, limited to the range [−3.0, 3.0] and quantized with a step size of 0.1. If a certain parameter (real or imaginary part of α) is not being used in a given frame, this is signaled in the bitstream, and the irrelevant parameter is not transmitted. The parameters are time-differentially or frequency-differentially coded and finally Huffman coding is applied using a scale factor codebook. The prediction coefficients are updated every second scale factor band, which results in a frequency resolution similar to that of MPEG Surround. This quantization and coding scheme results in an average bit rate of approximately 2 kb/s for the stereo side information within a typical configuration having a target bit rate of 96 kb/s.

Preferred additional or alternative implementation details comprise:

c) For each of the two parameters of α, one may choose non-differential (PCM) or differential (DPCM) coding on a per-frame or per-stream basis, signaled by a corresponding bit in the bit stream. For DPCM coding, either time- or frequency-differential coding is possible. Again, this may be signaled using a one-bit flag.

d) Instead of re-using a pre-defined code book such as the AAC scale factor book, one may also utilize a dedicated invariant or signal-adaptive code book to code the α parameter values, or one may revert to fixed-length (e.g. 4-bit) unsigned or two's-complement code words.

e) The range of α parameter values as well as the parameter quantization step size may be chosen arbitrarily and optimized to the signal characteristics at hand.

f) The number and spectral and/or temporal width of active α parameter bands may be chosen arbitrarily and optimized to the given signal characteristics. In particular, the band configuration may be signaled on a per-frame or per-stream basis.

g) In addition to or instead of the mechanisms outlined in a), above, it may be signaled explicitly by means of a bit per frame in the bitstream that only the MDCT spectrum of the current frame is used to compute the MDST spectrum approximation, i.e., that the adjacent MDCT frames are not taken into account.

Embodiments relate to an inventive system for unified stereo coding in the MDCT domain. It enables to utilize the advantages of unified stereo coding in the MPEG USAC system even at higher bit rates (where SBR is not used) without the significant increase in computational complexity that would come with a QMF-based approach.

The following two lists summarize advantageous configuration aspects described before, which can be used alternatively to each other or in addition to other aspects:

1a) general concept: complex-valued prediction of side MDCT from mid MDCT and MDST;

1b) calculate/approximate MDST from MDCT ("R2I transform") in frequency domain using one or more frames (3-frames approach introduces delay);

1c) truncation of filter (even down to 1-frame 2-tap, e.g. [−1 0 1]) to reduce computational complexity;

1d) proper handling of transform coefficients around DC and fs/2;

1e) proper handling of window shape switching;

1f) do not use previous/next frame if it has a different transform size;

1g) prediction based on non-quantized or quantized MDCT coefficients in the encoder;

2a) quantize and code real and imaginary part of complex prediction coefficient directly (i.e., no MPEG Surround parameterization);

2b) use uniform quantizer for this (step size e.g. 0.1);

2c) use appropriate frequency resolution for prediction coefficients (e.g. 1 coefficient per 2 scale factor bands);

2d) cheap signaling in case all prediction coefficients are real-valued;

2e) explicit bit per frame to force 1-frame R2I operation, i.e. do not use previous/next frame.

In an embodiment, the encoder additionally comprises: a spectral converter (50, 51) for converting a time-domain representation of the two channel signals to a spectral representation of the two channel signals having subband signals for the two channel signals, wherein the combiner (2031), the predictor (2033) and the residual signal calculator (2034) are configured to process each subband signal separately so that the first combined signal and the residual signal are obtained for a plurality of subbands, wherein the output interface (212) is configured for combining the encoded first combined signal and the encoded residual signal for the plurality of subbands.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

In an embodiment of the present invention, a proper handling of window shape switching is applied. When FIG. 10a is considered, a window shape information 109 can be input into the imaginary spectrum calculator 1001. Specifically, the imaginary spectrum calculator which performs the real-to-imaginary conversion of the real-valued spectrum such as the MDCT spectrum (such as element 2070 in FIG. 6a or element 1160a in FIG. 6b) can be implemented as a FIR or IIR filter. The FIR or IIR coefficients in this real-to-imaginary module 1001 depend on the window shape of the left half and of the right half of the current frame. This window shape can be different for a sine window or a KBD (Kaiser Bessel Derived)

window and, subject to the given window sequence configuration, can be a long window, a start window, a stop window, a stop-start window, or a short window. The real-to-imaginary module may comprise a two-dimensional FIR filter, where one dimension is the time dimension where two subsequent MDCT frames are input into the FIR filter, and the other dimension is the frequency dimension, where the frequency coefficients of a frame are input.

The subsequent table gives different MDST filter coefficients for a current window sequence for different window shapes and different implementations of the left half and the right half of the window.

The window shape information which is used on the decoder side is calculated on the encoder side and transmitted as side information together with the encoder output signal. On the decoder side, the window shape information 109 is extracted from the bitstream by the bitstream demultiplexer (for example 102 in FIG. 5*b*) and provided to the imaginary spectrum calculator 1001 as illustrated in FIG. 10*a*.

When the window shape information 109 signals that the previous frame had a different transform size, then it is advantageous that the previous frame is not used for calculating the imaginary spectrum from the real-valued spectrum. The same is true when it is found by interpreting the window shape

TABLE A

MDST Filter Parameters for Current Window

| Current Window Sequence | Left Half: Sine Shape<br>Right Half: Sine Shape | Left Half: KBD Shape<br>Right Half: KBD Shape |
|---|---|---|
| ONLY_LONG_SEQUENCE,<br>EIGHT_SHORT_SEQUENCE | [0.000000, 0.000000, 0.500000,<br>0.000000,<br>−0.500000, 0.000000, 0.000000] | [0.091497, 0.000000, 0.581427,<br>0.000000,<br>−0.581427, 0.000000, −0.091497] |
| LONG_START_SEQUENCE | [0.102658, 0.103791, 0.567149,<br>0.000000,<br>−0.567149, −0.103791, −0.102658] | [0.150512, 0.047969, 0.608574,<br>0.000000,<br>−0.608574, −0.047969, −0.150512] |
| LONG_STOP_SEQUENCE | [0.102658, −0.103791, 0.567149,<br>0.000000,<br>−0.567149, 0.103791, −0.102658] | [0.150512, −0.047969, 0.608574,<br>0.000000,<br>−0.608574, 0.047969, −0.150512] |
| STOP_START_SEQUENCE | [0.205316, 0.000000, 0.634298,<br>0.000000,<br>−0.634298, 0.000000, −0.205316] | [0.209526, 0.000000, 0.635722,<br>0.000000,<br>−0.635722, 0.000000, −0.209526] |

| Current Window Sequence | Left Half: Sine Shape<br>Right Half: KBD Shape | Left Half: KBD Shape<br>Right Half: Sine Shape |
|---|---|---|
| ONLY_LONG_SEQUENCE,<br>EIGHT_SHORT_SEQUENCE | [0.045748, 0.057238, 0.540714,<br>0.000000,<br>−0.540714, −0.057238, −0.045748] | [0.045748, −0.057238, 0.540714,<br>0.000000,<br>−0.540714, 0.057238, −0.045748] |
| LONG_START_SEQUENCE | [0.104763, 0.105207, 0.567861,<br>0.000000,<br>−0.567861, −0.105207, −0.104763] | [0.148406, 0.046553, 0.607863,<br>0.000000,<br>−0.607863, −0.046553, −0.148406] |
| LONG_STOP_SEQUENCE | [0.148406, −0.046553, 0.607863,<br>0.000000,<br>−0.607863, 0.046553, −0.148406] | [0.104763, −0.105207, 0.567861,<br>0.000000,<br>−0.567861, 0.105207, −0.104763] |
| STOP_START_SEQUENCE | [0.207421, 0.001416, 0.635010,<br>0.000000,<br>−0.635010, −0.001416, −0.207421] | [0.207421, −0.001416, 0.635010,<br>0.000000,<br>−0.635010, 0.001416, −0.207421] |

Additionally, the window shape information 109 provides window shape information for the previous window, when the previous window is used for calculating the MDST spectrum from the MDCT spectrum. Corresponding MDST filter coefficients for the previous window are given in the subsequent table as a function of the current window sequence and shape.

information 109 that the next frame has a different transform size. Then, the next frame is not used for calculating the imaginary spectrum from the real-valued spectrum. In such a case when, for example, the previous frame had a different transform size from the current frame and when the next frame again has a different transform size compared to the

TABLE B

MDST Filter Parameters for Previous Window

| Current Window Sequence | Left Half of Current Window:<br>Sine Shape | Left Half of Current Window:<br>KBD Shape |
|---|---|---|
| ONLY_LONG_SEQUENCE,<br>LONG_START_SEQUENCE,<br>EIGHT_SHORT_SEQUENCE<br>LONG_STOP_SEQUENCE,<br>STOP_START_SEQUENCE | [0.000000, 0.106103, 0.250000,<br>0.318310,<br>0.250000, 0.106103, 0.000000]<br>[0.038498, 0.039212, 0.039645,<br>0.039790,<br>0.039645, 0.039212, 0.038498] | [0.059509, 0.123714, 0.186579,<br>0.213077,<br>0.186579, 0.123714, 0.059509]<br>[0.026142, 0.026413, 0.026577,<br>0.026631,<br>0.026577, 0.026413, 0.026142] |

Hence, depending on the window shape information 109, the imaginary spectrum calculator 1001 in FIG. 10*a* is adapted by applying different sets of filter coefficients.

current frame, then only the current frame, i.e. the spectral values of the current window, are used for estimating the imaginary spectrum.

The prediction in the encoder is based on non-quantized or quantized frequency coefficients such as MDCT coefficients. When the prediction illustrated by element 2033 in FIG. 3a, for example, is based on non-quantized data, then the residual calculator 2034 advantageously also operates on non-quantized data and the residual calculator output signal, i.e. the residual signal 205, is quantized before being entropy-encoded and transmitted to a decoder. In an alternative embodiment, however, it is advantageous that the prediction is based on quantized MDCT coefficients. Then, the quantization can take place before the combiner 2031 in FIG. 3a so that a first quantized channel and a second quantized channel are the basis for calculating the residual signal. Alternatively, the quantization can also take place subsequent to the combiner 2031 so that the first combination signal and the second combination signal are calculated in a non-quantized form and are quantized before the residual signal is calculated. Again, alternatively, the predictor 2033 may operate in the non-quantized domain and the prediction signal 2035 is quantized before being input into the residual calculator. Then, it is useful that the second combination signal 2032, which is also input into the residual calculator 2034, is also quantized before the residual calculator calculates the residual signal D in FIG. 6a, which may be implemented within the predictor 2033 in FIG. 3a, operates on the same quantized data as are available on the decoder side. Then, it can be guaranteed that the MDST spectrum estimated in the encoder for the purpose of performing the calculation of the residual signal is exactly the same as the MDST spectrum on the decoder side used for performing the inverse prediction, i.e. for calculating the side signal form the residual signal. To this end, the first combination signal such as signal M on line 204 in FIG. 6a is quantized before being input into block 2070. Then, the MDST spectrum calculated using the quantized MDCT spectrum of the current frame, and depending on the control information, the quantized MDCT spectrum of the previous or next frame is input into the multiplier 2074, and the output of multiplier 2074 of FIG. 6a will again be a non-quantized spectrum. This non-quantized spectrum will be subtracted from the spectrum input into adder 2034b and the result will finally be quantized in quantizer 209b.

In an embodiment, the real part and the imaginary part of the complex prediction coefficient per prediction band are quantized and encoded directly, i.e. without for example MPEG Surround parameterization. The quantization can be performed using a uniform quantizer with a step size, for example, of 0.1. This means that any logarithmic quantization step sizes or the like are not applied, but any linear step sizes are applied. In an implementation, the value range for the real part and the imaginary part of the complex prediction coefficient ranges from −3 to 3, which means that 60 or, depending on implementational details, 61 quantization steps are used for the real part and the imaginary part of the complex prediction coefficient.

Advantageously, the real part applied in multiplier 2073 in FIG. 6a and the imaginary part 2074 applied in FIG. 6a are quantized before being applied so that, again, the same value for the prediction is used on the encoder side as is available on the decoder side. This guarantees that the prediction residual signal covers—apart from the introduced quantization error—any errors which might occur when a non-quantized prediction coefficient is applied on the encoder side while a quantized prediction coefficient is applied on the decoder side. Advantageously, the quantization is applied in such a way that—as far as possible—the same situation and the same signals are available on the encoder side and on the decoder side. Hence, it is advantageous to quantize the input into the real-to-imaginary calculator 2070 using the same quantization as is applied in quantizer 209a. Additionally, it is advantageous to quantize the real part and the imaginary part of the prediction coefficient α for performing the multiplications in item 2073 and item 2074. The quantization is the same as is applied in quantizer 2072. Additionally, the side signal output by block 2031 in FIG. 6a can also be quantized before the adders 2034a and 2034b. However, performing the quantization by quantizer 209b subsequent to the addition where the addition by these adders is applied with a non-quantized side signal is not problematic.

In a further embodiment of the present invention, a cheap signaling in case all prediction coefficients are real is applied. It can be the situation that all prediction coefficients for a certain frame, i.e. for the same time portion of the audio signal are calculated to be real. Such a situation may occur when the full mid signal and the full side signal are not or only little phase-shifted to each other. In order to save bits, this is indicated by a single real indicator. Then, the imaginary part of the prediction coefficient does not need to be signaled in the bitstream with a codeword representing a zero value. On the decoder side, the bitstream decoder interface, such as a bitstream demultiplexer, will interpret this real indicator and will then not search for codewords for an imaginary part but will assume all bits being in the corresponding section of the bitstream represent only the real-valued prediction coefficients. Furthermore, the predictor 2033, when receiving an indication that all imaginary parts of the prediction coefficients in the frame are zero, will not need to calculate an MDST spectrum, or generally an imaginary spectrum from the real-valued MDCT spectrum. Hence, element 1160a in the FIG. 6b decoder will be deactivated and the inverse prediction will only take place using the real-valued prediction coefficient applied in multiplier 1160b in FIG. 6b. The same is true for the encoder side where element 2070 will be deactivated and prediction will only take place using the multiplier 2073. This side information is advantageously used as an additional bit per frame, and the decoder will read this bit frame by frame in order to decide whether the real-to-imaginary converter 1160a will be active for a frame or not. Hence, providing this information results in a reduced size of the bitstream due to the more efficient signaling of all imaginary parts of the prediction coefficients being zero for a frame, and additionally, greatly reduces complexity for the decoder for such a frame which immediately results in a reduced battery consumption of such a processor implemented, for example, in a mobile battery-powered device.

The complex stereo prediction in accordance with embodiments of the present invention is a tool for efficient coding of channel pairs with level and/or phase differences between the channels. Using a complex-valued parameter α, the left and right channels are reconstructed via the following matrix. $dmx_{Im}$ denotes the MDST corresponding to the MDCT of the downmix channel $dmx_{Re}$.

$$\begin{bmatrix} r \\ l \end{bmatrix} = \begin{bmatrix} 1 - \alpha_{Re} & -\alpha_{Im} & 1 \\ 1 + \alpha_{Re} & \alpha_{Im} & -1 \end{bmatrix} \begin{bmatrix} dmx_{Re} \\ dmx_{Im} \\ res \end{bmatrix}$$

The above equation is another representation, which is split with respect to the real part and the imaginary part of α and represents the equation for a combined prediction/combination operation, in which the predicted signal S is not necessarily calculated.

The following data elements are advantageously used for this tool:

cplx_pred_all 0: Some bands use L/R coding, as signaled by cplx_pred_used[ ]
  1: All bands use complex stereo prediction
cplx_pred_used[g] [sfb] One-bit flag per window group g and scale factor band sfb (after mapping from prediction bands) indicating that
  0: complex prediction is not being used, L/R coding is used
  1: complex prediction is being used
complex_coef 0: $\alpha_{Im}=0$ for all prediction bands (real-only prediction)
  1: $\alpha_{Im}$ is transmitted for all prediction bands
use_prev_frame 0: Use only the current frame for MDST estimation
  1: Use current and previous frame for MDST estimation
delta_code_time 0: Frequency differential coding of the prediction coefficients
  1: Time differential coding of the prediction coefficients
hcod_alpha_q_re Huffman code of $\alpha_{Re}$
hcod_alpha_q_im Huffman code of $\alpha_{Im}$ FIG. 13a illustrates a further data element, which the present invention relies on, i.e. the prediction direction indicator pred_dir. This data element indicates the direction of the prediction according to the table in FIG. 13a. Hence, a first value of 0 means a prediction from mid to side channel, and a second value such as a value of "1" means a prediction from side to mid channel.

These data elements are calculated in an encoder and are put into the side information of a stereo or multi-channel audio signal. The elements are extracted from the side information on the decoder side by a side information extractor and are used for controlling the decoder calculator to perform a corresponding action.

Complex stereo prediction may use the downmix MDCT spectrum of the current channel pair and, in case of complex_coef=1, an estimate of the downmix MDST spectrum of the current channel pair, i.e. the imaginary counterpart of the MDCT spectrum. The downmix MDST estimate is computed from the current frame's MDCT downmix and, in case of use_prev_frame=1, the previous frame's MDCT downmix. The previous frame's MDCT downmix of window group g and group window b is obtained from that frame's reconstructed left and right spectra.

The computation of the downmix MDST estimate depends on the MDCT transform, whose length is even, on window_sequence, as well as on filter_coefs and filter_coefs_prev, which are arrays containing the filter kernels and which are derived according to the previous tables.

For all prediction coefficients the difference to a preceding (in time or frequency) value is coded using a Huffman code book. Prediction coefficients are not transmitted for prediction bands for which cplx_pred_used=0.

The inverse quantized prediction coefficients alpha_re and alpha_im are given by alpha_re=alpha_q_re*0.1 alpha_im=alpha_q_im*0.1

Without prediction direction reversal problems may occur when the side signal S has a rather high energy compared to the downmix signal M. In such cases, it may become difficult to predict the dominant part of the signal present in S, especially when M is of very low level and thus primarily consists of noise components.

Furthermore, the range of values for the prediction coefficient α may become very large, potentially leading to coding artifacts due to unwanted amplification or panning of quantization noise (e.g. spatial unmasking effects).

To give an example, one can consider a slightly panned out-of-phase signal with R=−0.9·L $R=-0.9 \cdot L;$ $M=-0.5 \cdot (L+R)=0.05 \cdot L;$ $S=0.5 \cdot (L-R)=0.95 \cdot L;$ $RES=S-(\alpha*M);$ optimum α:

$\alpha=19;$ which leads to a rather large optimum prediction factor of 19.

In accordance with the present invention, the direction of prediction is switched, and this results in an increase in prediction gain with minimum computational effort and a smaller α.

In case of a side signal S with high energy compared to the mid signal M, it becomes of interest to reverse the direction of the prediction so that M is being predicted from the complex-value representation of S as, for example, illustrated in FIG. 13b(2). When switching the direction of prediction, so that M is predicted from S, an additional MDST is advantageously needed for S, but no MDST may be used for M. Additionally, in this case, instead of the mid signal as in the first alternative in FIG. 13b(1), the (real-valued) side signal has to be transmitted to the decoder together with the residual signal and the prediction information α.

The switching of the prediction direction can be done on a per-frame basis, i.e. on the time axis, a per-band basis, i.e. on the frequency axis, or a combination thereof so that per band and frequency switching is allowed. This results in a prediction direction indicator (a bit) for each frame and each band, but it might be useful to only allow a single prediction direction for each frame.

To this end, the prediction direction calculator 219 is provided, which is illustrated in FIG. 12a. As in other figures, FIG. 12a illustrates an MDCT stage 50/51, a mid/side coding stage 2031, a real-to-complex converter 2070, prediction signal calculator 2073/2074 and a final residual signal calculator 2034. Additionally, a prediction direction-control M/S swapper 507 is provided which is configured and useful for implementing the two different prediction rules 502, 503 illustrated in FIG. 11a. The first prediction rule is that the swapper 507 is in the first state, i.e. where M and S are not swapped. The second prediction rule is implemented when the swapper 507 is in the swapping state, i.e. where M and S are swapped from the input to the output. This implementation has the advantage that the whole circuitry behind the swapper 507 is the same for both prediction directions.

Figure 12B:
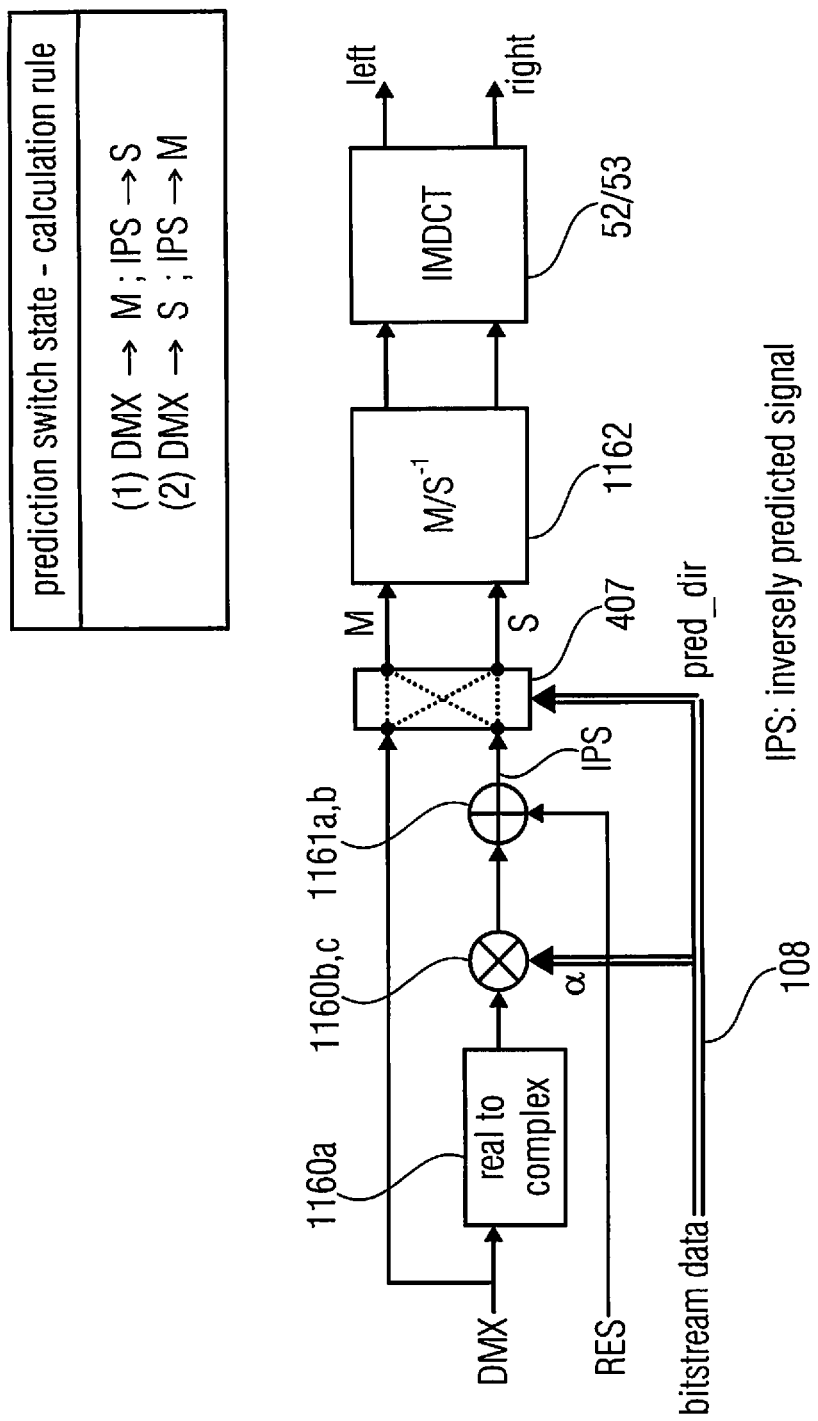
FIG. 12b illustrates a further embodiment of an audio or video decoder controlled by a prediction direction indicator.

Similarly, the different decoding rules 402, 403, i.e. the different decoder calculation rules can also be implemented by a swapper 407 at the input of the combiner 1162 which, in the FIG. 12b embodiment, is implemented to perform an inverse mid/side coding. The swapper 407 which can also be termed a "prediction switch" receives, at its input, the downmix signal DMX and a signal IPS, where IPS stands for inversely predicted signal. Depending on the prediction direction indicator, the swapper 407 either connects DMX to M and IPS to S or connects to DMX to S and IPS to M as illustrated in the table above FIG. 12b.

FIG. 13b illustrates an implementation of the first calculation rule of FIG. 11b, i.e. the rule illustrated by block 402. In the first embodiment, the inverse prediction is explicitly performed so that the side signal is explicitly calculated from the residual signal and the transmitted mid signal. Then, in a subsequent step, L and R are calculated by the equations to the right of the explicit inverse prediction equation in FIG. 13. In an alternative implementation, an implicit inverse prediction is performed, where the side signal S is not explicitly calculated, but where the left signal L and the right signal R are directly calculated from the transmitted M signal and the transmitted residual signal using the prediction information α.

FIG. 13d illustrates the equations for the other prediction direction, i.e. when the prediction direction indicator pred_dir is equal to 1. Again, an explicit inverse prediction to obtain M can be performed using the transmitted residual signal and the transmitted side signal and a subsequent calculation of L and R can be done using the mid signal and the side signal. Alternatively, an implicit inverse prediction can be performed so that L and R are calculated from the transmitted signal S, the residual signal and the prediction information α without explicitly calculating the mid signal M.

As outlined below in FIG. 13b, the sign of α can be reversed in all equations. When this is performed, FIG. 13b has, for the residual signal calculation, a sum between the two terms. Then, the explicit inverse prediction turns into a difference calculation. Depending on the actual implementation, the notation as outlined in FIG. 13b to FIG. 13d or the inverse notation may be convenient.

In the equations in FIG. 13b to FIG. 13d, several complex multiplications may occur. These complex multiplications may occur for all cases, where a is a complex number. Then, the complex approximation of M or S may be used as stated in the equations. The complex multiplication will incur a difference between the actual multiplication of the real part of the two factors and the product of the imaginary parts of the two factors as illustrated in FIG. 13e for the case of α only or for the case of (1+α).

The prediction direction calculator 219 can be implemented in different ways. FIG. 14 illustrates two basic ways for calculating the prediction direction. One way is a feed forward calculation, where the signal M and the signal S, which are generally the first combination signal and the second combination signal, are compared by calculating an energy difference as indicated in step 550. Then, in step 551 the difference is compared to a threshold, where the threshold can be set via a threshold input line or can be fixed to a program. However, it is advantageous that there is some hysteresis. Hence, as a decision criterion for the actual prediction direction, the energy difference between S and M can be evaluated. In order to achieve the best perceptual quality, the decision criterion may, therefore, be stabilized by using some hysteresis, i.e. different decision thresholds based on the last frame's prediction direction. Another conceivable criterion for the prediction direction would be the inter-channel phase difference of the input channels. Regarding the hysteresis, the control of the threshold can be performed in such a way that rare changes of the prediction direction in a certain time interval are favored over many changes in this time interval. Therefore, starting from a certain threshold, the threshold may be increased in response to a prediction direction change. Then, based on this high value, the threshold can be reduced more and more during periods where no prediction direction change is calculated. Then, when the threshold approaches its value before the last change, the threshold remains at the same level and the system is once again ready to change the prediction direction. This procedure allows changes within short intervals only when there is a very high difference between S and M, but allows less frequent changes when the energy differences between M and S are not so high.

Alternatively, or additionally, a feedback calculation can be performed, where the residual signals for both prediction directions are calculated as illustrated in step 552. Then, in step 553, the prediction direction is calculated which results in a smaller residual signal or less bits for the residual signal or the downmix signal or a smaller number of overall bits or a better quality of the audio signal or in any other specific condition. Therefore, the prediction direction resulting in a certain optimization target is selected in this feedback calculation.

It is to be emphasized that the invention is not only applicable to stereo signals, i.e. multi-channel signals having only two channels, but is also applicable to two channels of a multi-channel signal having three or more channels such as a 5.1 or 7.1 signal. An embodiment for a multi-channel implementation may comprise the identification of a plurality of pairs of signals and the calculation and parallel transmission or storage of the data for more than one pair of signals.

In an embodiment of the audio decoder, the encoded or decoded first combination signal 104 and the encoded or decoded prediction residual signal 106 each comprises a first plurality of subband signals, wherein the prediction information comprises a second plurality of prediction information parameters, the second plurality being smaller than the first plurality, wherein the predictor 1160 is configured for applying the same prediction parameter to at least two different subband signals of the decoded first combination signal, wherein the decoder calculator 116 or the combination signal calculator 1161 or the combiner 1162 are configured for performing a subband-wise processing; and wherein the audio decoder further comprises a synthesis filterbank 52, 53 for combining subband signals of the decoded first combination signal and the decoded second combination signal to obtain a time-domain first decoded signal and a time-domain second decoded signal.

In an embodiment of the audio decoder, the predictor 1160 is configured for receiving window shape information 109 and for using different filter coefficients for calculating an imaginary spectrum, where the different filter coefficients depend on different window shapes indicated by the window shape information 109.

In an embodiment of the audio decoder, the decoded first combination signal is associated with different transform lengths indicated by a transform length indicator included in the encoded multi-channel signal 100, and in which the predictor 1160 is configured for only using one or more frames of the first combination signal having the same associated transform length for estimating the imaginary part for a current frame for a first combination signal.

In an embodiment of the audio decoder, the predictor 1160 is configured for using a plurality of subbands of the decoded first combination signal adjacent in frequency, for estimating the imaginary part of the first combination signal, and wherein, in case of low or high frequencies, a symmetric extension in frequency of the current frame of the first combination signal is used for subbands associated with frequencies lower or equal to zero or higher or equal to a half of a sampling frequency on which the current frame is based, or in which filter coefficients of a filter included in the predictor 1160a are set to different values for the missing subbands compared to non-missing subbands.

In an embodiment of the audio decoder, the prediction information 108 is included in the encoded multi-channel signal in a quantized and entropy-encoded representation, wherein the audio decoder further comprises a prediction information decoder 65 for entropy-decoding or dequantizing to obtain a decoded prediction information used by the predictor 1160, or in which the encoded multi-channel audio signal comprises a data unit indicating in the first state that the predictor 1160 is to use at least one frame preceding or following in time to a current frame of the decoded first combination signal, and indicating in the second state that the predictor 1160 is to use only a single frame of the decoded first combination signal for an estimation of an imaginary part for the current frame of the decoded first combination signal, and in which the predictor 1160 is configured for sensing a state of the data unit and for operating accordingly.

In an embodiment of the audio decoder, the prediction information 108 comprises codewords of differences between time sequential or frequency adjacent complex values, and wherein the audio decoder is configured for performing an entropy decoding step and a subsequent difference decoding step to obtain time sequential quantized complex prediction values or complex prediction values for adjacent frequency bands.

In an embodiment of the audio decoder, the encoded multi-channel signal comprises, as side information, a real indicator indicating that all prediction coefficients for a frame of the encoded multi-channel signal are real-valued, wherein the audio decoder is configured for extracting the real indicator from the encoded multi-channel audio signal 100, and wherein the decoder calculator 116 is configured for not calculating an imaginary signal for a frame, for which the real indicator is indicating only real-valued prediction coefficients.

In an embodiment of the audio encoder, the predictor 2033 comprises a quantizer for quantizing the first channel signal, the second channel signal, the first combination signal or the second combination signal to obtain one or more quantized signals, and wherein the predictor 2033 is configured for calculating the residual signal using quantized signals.

In an embodiment of the audio encoder, the first channel signal is a spectral representation of a block of samples, and the second channel signal is a spectral representation of a block of samples, wherein the spectral representations are either pure real spectral representations or pure imaginary spectral representations, in which the optimizer 207 is configured for calculating the prediction information 206 as a real-valued factor different from zero and/or as an imaginary factor different from zero, and in which the encoder calculator 203 is configured to calculate the first combination signal and the prediction residual signal so that the prediction signal is derived from the pure real spectral representation or the pure imaginary spectral representation using the real-valued factor.

The inventive encoded audio signal can be stored on a digital storage medium or can be transmitted on a transmission medium such as a wireless transmission medium or a wired transmission medium such as the Internet.

Although the present invention is mainly described in the context of audio processing, it is to be emphasized that the invention can also be applied to the coding of decoding of video signals. The complex prediction with varying direction can be applied to the e.g. 3D stereo video compression. In this particular example, a 2D-MDCT is used. An example for this technique is Google WebM/VP8. However, other implementations without a 2D-MDCT can be applied as well.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory or tangible data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An audio or video decoder for decoding an encoded multi-channel audio or video signal, the encoded multi-channel audio or video signal comprising an encoded first combination signal, an encoded prediction residual signal and prediction information, comprising:

a signal decoder for decoding the encoded first combination signal to acquire a decoded first combination signal, and for decoding the encoded residual signal to acquire a decoded residual signal; and a decoder calculator for calculating a decoded multi-channel signal comprising a decoded first channel signal, and a decoded second channel signal using the decoded residual signal, the prediction information, the decoded first combination signal and a prediction direction indicator indicating a prediction direction associated with the decoded prediction residual signal, so that the decoded first channel signal and the decoded second channel signal are at least approximations of a first channel signal and a second channel signal of a multi-channel signal, wherein the decoder calculator is configured for using a first calculation rule for calculating the decoded multi-channel signal in case of a first state of the prediction direction indicator and for using a second different calculation rule for calculating the decoded multi-channel signal in case of a second different state of the prediction direction indicator.

2. The audio or video decoder in accordance with claim 1, in which the prediction direction indicator is comprised by the encoded multi-channel signal, and in which the audio or video decoder further comprises an input interface for extracting the prediction direction indicator and for forwarding the prediction direction indicator to the decoder calculator.

3. The audio or video decoder in accordance with claim 1, in which the decoded first combination signal comprises a mid signal, in which the first calculation rule comprises the calculation of a side signal from the decoded first combination signal and the decoded residual signal; or in which the decoded first combination signal comprises a side signal, and in which the second calculation rule comprises the calculation of a mid signal from the decoded first combination signal and the decoded residual signal.

4. The audio or video decoder in accordance with claim 1, in which the decoded first combination signal comprises a mid signal, and in which the first calculation rule comprises the calculation of the decoded first channel signal and the calculation of the decoded second channel signal using the mid signal, the prediction information and the decoded residual signal without an explicit calculation of the side signal; or in which the decoded first combination signal comprises a side signal, and in which the second calculation rule comprises the calculation of the decoded first channel signal and the calculation of the decoded second channel signal using the side signal, the prediction information and the decoded residual signal without an explicit calculation of the mid signal.

5. The audio or video decoder in accordance with claim 1, in which the decoder calculator is configured for using the prediction information where the prediction information comprises a real-valued portion different from zero and/or an imaginary portion different from zero.

6. The audio or video decoder of claim 1, in which the decoder calculator comprises:

a predictor for applying the prediction information to the decoded first combination signal or to a signal derived from the decoded first combination signal to acquire a prediction signal;

a combination signal calculator for calculating a second combination signal by combining the decoded residual signal and the prediction signal; and a combiner for combining the decoded first combination signal and the second combination signal to acquire a decoded multi-channel audio or video signal comprising the decoded first channel signal and the decoded second channel signal, wherein in case of a first state of the prediction direction indicator, the first combination signal is a sum signal and the second combination signal is a difference signal, or wherein in case of a second state of the prediction direction indicator, the first combination signal is a difference signal and the second combination signal is a sum signal.

7. The audio or video decoder in accordance with claim 1, in which the encoded first combination signal and the encoded residual signal have been generated using an aliasing generating time-spectral conversion, wherein the decoder further comprises:

a spectral-time converter for generating a time-domain first channel signal and a time-domain second channel signal using a spectral-time conversion algorithm matched to the time-spectral conversion algorithm;

an overlap/add processor for conducting an overlap-add processing for the time-domain first channel signal and for the time-domain second channel signal to acquire an aliasing-free first time-domain signal and an aliasing-free second time-domain signal.

8. The audio or video decoder in accordance with claim 1, in which the prediction information comprises a real-valued factor different from zero, in which the predictor is configured for multiplying the decoded first combination signal by the real factor to acquire a first part of the prediction signal, and in which the combination signal calculator is configured for linearly combining the decoded residual signal and the first part of the prediction signal.

9. The audio or video decoder in accordance with claim 1, in which the prediction information comprises an imaginary factor different from zero, in which the predictor is configured for estimating an imaginary part of the decoded first combination signal using a real-valued part of the decoded first combination signal, in which the predictor is configured for multiplying the imaginary part of the decoded first combination signal by the imaginary factor of the prediction information to acquire a second part of the prediction signal; and in which the combination signal calculator is configured for linearly combining the first part of the prediction signal and the second part of the prediction signal and the decoded residual signal to acquire a second combination signal.

10. The audio or video decoder in accordance with claim 6, in which the predictor is configured for filtering at least two time-subsequent frames, where one of the two time-subsequent frames precedes or follows a current frame of the first combination signal to acquire an estimated imaginary part of a current frame of the first combination signal using a linear filter.

11. The audio or video decoder in accordance with claim 6, in which the decoded first combination signal comprises a sequence of real-valued signal frames, and in which the predictor is configured for estimating an imaginary part of the current signal frame using only the current real-valued signal frame of the decoded first combination signal, or in which the predictor is configured for estimating an imaginary part of the current signal frame using the current real-valued signal frame of the decoded first combination signal and only one or more preceding real-valued signal frames of the decoded first combination signal, or in which the predictor is configured for estimating an imaginary part of the current signal frame using the current real-valued signal frame of the decoded first combination signal and only one or more following real-valued signal frames of the decoded first combination signal, or in which the predictor is configured for estimating an imaginary part of the current signal frame using the current real-valued signal frame of the decoded first combination signal and one or more preceding real-valued signal frames and one or more following real-valued signal frames of the decoded first combination signal.

12. An audio or video encoder for encoding a multi-channel audio or video signal comprising two or more channel signals, comprising:
   an encoder calculator for calculating a first combination signal and a prediction residual signal using a first channel signal and a second channel signal and prediction information and a prediction direction indicator indicating a prediction direction associated with the prediction residual signal, so that a prediction residual signal, when combined with a prediction signal derived from the first combination signal or a signal derived from the first combination signal and the prediction information results in a second combination signal,
   wherein the encoder calculator comprises a combiner for combining the first channel signal and the second channel signal in two different ways to acquire the first combination signal and the second combination signal;
   an optimizer for calculating the prediction information so that the prediction residual signal fulfills an optimization target;
   a prediction direction calculator for calculating the prediction direction indicator indicating the prediction direction associated with the prediction residual signal;
   a signal encoder for encoding the first combination signal and the prediction residual signal to acquire an encoded first combination signal and an encoded prediction residual signal; and
   an output interface for combining the encoded first combination signal, the encoded prediction residual signal and the prediction information to acquire an encoded multi-channel audio or video signal.

13. The audio or video encoder in accordance with claim 12, in which the encoder calculator comprises:
   a combiner for combining the first channel signal and the second channel signal in two different ways to acquire the first combination signal and the second combination signal;
   a predictor for applying the prediction information to the first combination signal or a signal derived from the first combination signal to acquire a prediction signal or for applying prediction information to the second combination signal or a signal derived from the second combination signal to acquire a prediction signal depending on the prediction direction indicator; and
   a residual signal calculator for calculating the prediction residual signal by combining the prediction signal and the second combination signal or by combining the prediction signal and the first combination signal depending on the prediction direction indicator.

14. The audio or video encoder in accordance with claim 12,
   in which the first channel signal is a spectral representation of a block of samples;
   in which the second channel signal is a spectral representation of a block of samples,
   wherein the spectral representations are either pure real-valued spectral representations or pure imaginary spectral representations,
   in which the optimizer is configured for calculating the prediction information as a real-valued factor different from zero and/or as an imaginary factor different from zero, and
   in which the encoder calculator comprises a real-to-imaginary transformer or an imaginary-to-real transformer for deriving a transform spectral representation from the first combination signal or from the second combination signal depending on the prediction direction indicator, and
   in which the encoder calculator is configured to calculate the first combination signal or the second combination signal depending on the prediction direction indicator and to calculate the prediction residual signal from the transformed spectrum and the imaginary factor.

15. The encoder in accordance with claim 12,
   in which the predictor is configured for multiplying the first combination signal by a real part of the prediction information to acquire a first part of the prediction signal;
   for estimating an imaginary part of the first combination signal or of the second combination signal using the first combination signal or the second combination signal;
   for multiplying the imaginary part of the first or the second combined signal by an imaginary part of the prediction information to acquire a second part of the prediction signal; and
   wherein the residual calculator is configured for linearly combining the first part signal of the prediction signal or the second part signal of the prediction signal and the second combination signal or the first combination signal to acquire the prediction residual signal.

16. A method of decoding an encoded multi-channel audio or video signal, the encoded multi-channel audio or video signal comprising an encoded first combination signal, an encoded prediction residual signal and prediction information, comprising:
   decoding the encoded first combination signal to acquire a decoded first combination signal, and decoding the encoded residual signal to acquire a decoded residual signal; and
   calculating a decoded multi-channel signal comprising a decoded first channel signal, and a decoded second channel signal using the decoded residual signal, the prediction information, the decoded first combination signal and a prediction direction indicator indicating a prediction direction associated with the decoded prediction residual signal, so that the decoded first channel signal and the decoded second channel signal are at least approximations of a first channel signal and a second channel signal of a multi-channel signal,
   wherein calculating the decoded multi-channel signal comprises using a first calculation rule for calculating the decoded multi-channel signal in case of a first state of the prediction direction indicator and using a second different calculation rule for calculating the decoded multi-channel signal in case of a second different state of the prediction direction indicator.

17. A method of encoding a multi-channel audio or video signal comprising two or more channel signals, comprising:
  calculating a first combination signal and a prediction residual signal using a first channel signal and a second channel signal, prediction information and a prediction direction indicator indicating a prediction direction associated with the prediction residual signal, so that a prediction residual signal, when combined with a prediction signal derived from the first combination signal or a signal derived from the first combination signal and the prediction information results in a second combination signal,
  combining the first channel signal and the second channel signal in two different ways to acquire the first combination signal and the second combination signal;
  calculating the prediction information so that the prediction residual signal fulfills an optimization target;
  calculating the prediction direction indicator indicating the prediction direction associated with the prediction residual signal;
  encoding the first combination signal and the prediction residual signal to acquire an encoded first combination signal and an encoded residual signal; and
  combining the encoded first combination signal, the encoded prediction residual signal and the prediction information to acquire an encoded multi-channel audio or video signal.

18. A non-transitory storage medium having stored thereon a computer program for performing, when running on a computer or a processor, the method of decoding an encoded multi-channel audio or video signal, the encoded multi-channel audio or video signal comprising an encoded first combination signal, an encoded prediction residual signal and prediction information, said method comprising:
  decoding the encoded first combination signal to acquire a decoded first combination signal, and decoding the encoded residual signal to acquire a decoded residual signal; and
  calculating a decoded multi-channel signal comprising a decoded first channel signal, and a decoded second channel signal using the decoded residual signal, the prediction information, the decoded first combination signal and a prediction direction indicator indicating a prediction direction associated with the decoded prediction residual signal, so that the decoded first channel signal and the decoded second channel signal are at least approximations of the first channel signal and the second channel signal of the multi-channel signal,
  wherein calculating the decoded multi-channel signal comprises using a first calculation rule for calculating the decoded multi-channel signal in case of a first state of the prediction direction indicator and using a second different calculation rule for calculating the decoded multi-channel signal in case of a second different state of the prediction direction indicator.

19. A non-transitory storage medium having stored thereon a computer program for performing, when running on a computer or a processor, the method of encoding a multi-channel audio or video signal comprising two or more channel signals, said method comprising:
  calculating a first combination signal and a prediction residual signal using a first channel signal and a second channel signal predictioninformation and a prediction direction indicator indicating a prediction direction associated with the decoded prediction residual signal, so that a prediction residual signal, when combined with a prediction signal derived from the first combination signal or a signal derived from the first combination signal and the prediction information results in a second combination signal,
  combining the first channel signal and the second channel signal in two different ways to acquire the first combination signal and the second combination signal;
  calculating the prediction information so that the prediction residual signal fulfills an optimization target;
  calculating the prediction direction indicator indicating the prediction direction associated with the prediction residual signal;
  encoding the first combination signal and the prediction residual signal to acquire an encoded first combination signal and an encoded residual signal; and
  combining the encoded first combination signal, the encoded prediction residual signal and the prediction information to acquire an encoded multi-channel audio or video signal.

* * * * *